(12) United States Patent
Palanigounder et al.

(10) Patent No.: US 11,356,844 B2
(45) Date of Patent: Jun. 7, 2022

(54) WWAN-WLAN AGGREGATION SECURITY

(71) Applicant: QUALCOMM Incorporated, San Diego, CA (US)

(72) Inventors: Anand Palanigounder, San Diego, CA (US); Jouni Kalevi Malinen, Tuusula (FI)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/843,592

(22) Filed: Apr. 8, 2020

(65) Prior Publication Data

US 2020/0236543 A1    Jul. 23, 2020

Related U.S. Application Data

(62) Division of application No. 15/281,646, filed on Sep. 30, 2016, now Pat. No. 10,623,951.

(Continued)

(51) Int. Cl.
*H04L 9/40* (2022.01)
*H04L 9/06* (2006.01)
(Continued)

(52) U.S. Cl.
CPC ......... *H04W 12/041* (2021.01); *H04L 9/0643* (2013.01); *H04L 63/061* (2013.01);
(Continued)

(58) Field of Classification Search
None
See application file for complete search history.

(56) References Cited

U.S. PATENT DOCUMENTS

| 10,623,951 B2 | 4/2020 | Palanigounder et al. |
| 2009/0054037 A1* | 2/2009 | Kaippallimalil ........ H04L 63/08 |
| | | 455/411 |

(Continued)

FOREIGN PATENT DOCUMENTS

| CN | 101998394 A | 3/2011 |
| CN | 101217364 B | 3/2012 |

(Continued)

OTHER PUBLICATIONS

International Preliminary Report on Patentability—PCT/US2017/019203, The International Bureau of WIPO—Geneva, Switzerland, dated Jun. 6, 2018.

(Continued)

*Primary Examiner* — Yogesh Paliwal
*Assistant Examiner* — Hassan Saadoun
(74) *Attorney, Agent, or Firm* — Loza & Loza, LLP

(57) ABSTRACT

One feature pertains to a method for secure wireless communication at an apparatus of a network. The method includes receiving a user equipment identifier identifying a user equipment and a cryptographic key from a wireless wide area network node, and using the cryptographic key as a pairwise master key (PMK). A PMK identifier (PKMID) is generated based on the PMK and the two are stored at the network. A PMK security association is initialized by associating the PMK with at least the PMKID and an access point identifier identifying an access point of the apparatus. An association request is received that includes a PMKID from the user equipment, and it's determined that the PMKID received from the user equipment matches the PMKID stored. A key exchange is initiated with the user equipment based on the PMK to establish a wireless local area network security association with the user equipment.

40 Claims, 21 Drawing Sheets

Related U.S. Application Data

(60) Provisional application No. 62/305,770, filed on Mar. 9, 2016.

(51) Int. Cl.

| | | |
|---|---|---|
| *H04W 36/00* | (2009.01) | |
| *H04W 12/041* | (2021.01) | |
| *H04W 12/08* | (2021.01) | |
| *H04W 84/04* | (2009.01) | |
| *H04W 36/14* | (2009.01) | |
| *H04W 12/04* | (2021.01) | |
| *H04W 12/06* | (2021.01) | |
| *H04W 12/0431* | (2021.01) | |
| *H04W 12/0433* | (2021.01) | |
| *H04W 88/06* | (2009.01) | |
| *H04W 92/02* | (2009.01) | |
| *H04W 92/20* | (2009.01) | |
| *H04L 12/66* | (2006.01) | |
| *H04W 84/12* | (2009.01) | |

(52) U.S. Cl.
CPC ........ *H04L 63/0876* (2013.01); *H04W 12/04* (2013.01); *H04W 12/0431* (2021.01); *H04W 12/0433* (2021.01); *H04W 12/06* (2013.01); *H04W 12/08* (2013.01); *H04W 36/0038* (2013.01); *H04W 36/0069* (2018.08); *H04W 36/14* (2013.01); *H04W 84/04* (2013.01); *H04L 12/66* (2013.01); *H04L 63/06* (2013.01); *H04L 2209/24* (2013.01); *H04L 2463/061* (2013.01); *H04W 84/042* (2013.01); *H04W 84/12* (2013.01); *H04W 88/06* (2013.01); *H04W 92/02* (2013.01); *H04W 92/20* (2013.01)

(56) References Cited

U.S. PATENT DOCUMENTS

| | | | |
|---|---|---|---|
| 2009/0172398 A1 | 7/2009 | Falk et al. | |
| 2011/0047382 A1* | 2/2011 | Wang | H04L 63/06 |
| | | | 713/170 |
| 2014/0050320 A1* | 2/2014 | Choyi | H04W 12/06 |
| | | | 380/270 |
| 2014/0080904 A1 | 3/2014 | Desai et al. | |
| 2014/0181904 A1* | 6/2014 | Craig | H04W 36/14 |
| | | | 726/3 |
| 2015/0085747 A1 | 3/2015 | Cho et al. | |
| 2017/0265069 A1 | 9/2017 | Palanigounder et al. | |

FOREIGN PATENT DOCUMENTS

| | | | |
|---|---|---|---|
| CN | 103313242 A | 9/2013 | |
| CN | 104247482 A | 12/2014 | |
| CN | 104852896 A | 8/2015 | |
| CN | 105052184 A | 11/2015 | |
| EP | 2375798 A2 | 10/2011 | |
| KR | 20080067078 A * | 7/2008 | ............ H04W 12/04 |
| KR | 20080067078 A | 7/2008 | |
| WO | 2009140228 A1 | 11/2009 | |
| WO | 2016015748 A1 | 2/2016 | |

OTHER PUBLICATIONS

International Search Report and Written Opinion—PCT/US2017/019203—ISA/EPO—dated Jun. 12, 2017.
Yang L., et al., "RFC 4118—Taxonomy for Control and Provisioning of Wireless Access Points (CAPWAP)", IETF, Jun. 2005, pp. 1-41, [2 Search Apr. 22, 02], Internet, URL, https://tools.ietf.org/html/rfc4118.
European Search Report—EP20195845—Search Authority—The Hague—dated Oct. 6, 2020.
"IEEE Std 802.11(TM) 2012, (Revision of IEEE Std 802.11-2007)" IEEE Standard for Information technology—Telecommunications and information exchange between systems—Local and metropolitan area networks—Specific Yequirements Part 11: Wireless LAN Medium Access Control (MAC) and Physical Layer (PHY) specifications, The nstitute of Electrical and Electronics Engineers, Inc., 146 Pages, (Mar. 29, 2012).
Taiwan Search Report—TW106105810—TIPO—dated Nov. 18, 2020.
CISCO: "802.11r Fast Transition Roaming", 802.11r, 802.11k, and 802.11w Deployment Guide, Cisco 105-XE Release 3.3, Jul. 15, 2015, 8 Pages.
Lvsen L., "Research of WLAN Based on Multi hop Routing Technology", China New Telecommunications, Dec. 11, 2009.

\* cited by examiner

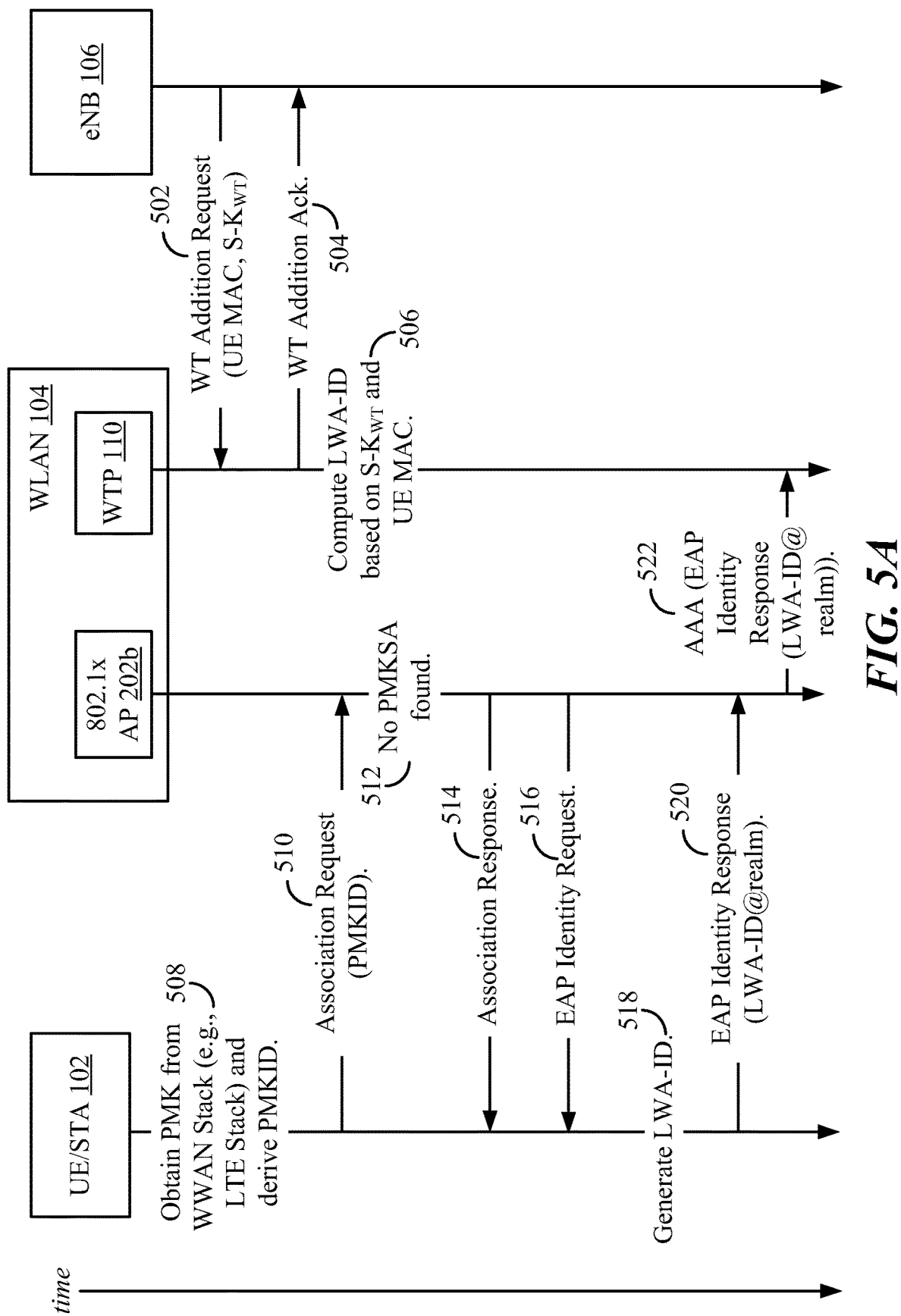

WWAN-WLAN AGGREGATION SECURITY

CLAIM OF PRIORITY

The present application for patent claims priority to, and is a divisional patent application of, U.S. Utility patent application Ser. No. 15/281,646, filed Sep. 30, 2016, which claims priority to provisional application No. 62/305,770 entitled "WWAN-WLAN AGGREGATION SECURITY" filed Mar. 9, 2016, the entire disclosure of which is hereby expressly incorporated by reference.

BACKGROUND

Field

Various aspects of the present disclosure relate to wireless communications and, more particularly, to methods, apparatuses, and systems for providing security to communications components employing wireless wide area network (WWAN) wireless local area network (WLAN) aggregation.

Background

In recent years, usage of mobile device data has been growing at an exponential rate by almost doubling every year. Although advances in cellular technology have increased the performance and capacity of cellular networks, it's predicted that this alone will not be enough to meet the demand for mobile data. Using unlicensed spectrum provides an excellent opportunity for cellular operators to help their subscribers by increasing network data capacity.

The traditional method for data offloading to unlicensed spectrum by cellular operators has been to use 802.1x based WLAN networks. These networks may be deployed by cellular operators themselves or others. In order to provide an architectural framework and standardization for WLAN offloading, standardization bodies have developed several solutions that enable interworking with WLAN and provide data offloading through switching of data bearers to WLAN.

One option for WWAN (e.g., long term evolution (LTE) networks) and WLAN interworking is data aggregation at the radio access network (RAN). Such data aggregation, which may be referred to herein as LTE-WLAN aggregation or LWA, involves an Evolved NodeB (eNB) scheduling packets to be served on LTE and WLAN (e.g., Wi-Fi®) radio links.

One advantage of such a method is that it may provide better utilization/control of resources on both the LTE and WLAN links. This can increase the aggregate throughput for all devices/users and improve the total system capacity by better managing the radio resources among devices/users. Scheduling decisions for each link can be made at a packet level based on real-time channel conditions and system resource availability. Furthermore, data aggregation at the RAN can be implemented without any changes to the core network since the WLAN radio link effectively becomes part of the Enhanced Universal Terrestrial Radio Access Network (E-UTRAN).

Along with the aforementioned advantages of LWA come new concerns over data security. Care must be taken to secure data that is now transmitted over both WWAN and WLAN links There is a need for methods, apparatuses, and systems that secure communications between user devices and WWAN and WLAN network components in such LWA systems.

SUMMARY

One feature provides a method for secure wireless communication at an apparatus associated with a network, the method comprising receiving a user equipment identifier identifying a user equipment and a cryptographic key from a wireless wide area network (WWAN) node, using the cryptographic key as a pairwise master key (PMK), generating a PMK identifier (PKMID) based on the PMK, storing the PMK and the PMKID, initializing a PMK security association (PMKSA) by associating the PMK with at least the PMKID and an access point identifier identifying an access point of the apparatus, receiving an association request that includes a PMKID from the user equipment, determining that the PMKID received from the user equipment matches the PMKID stored, and initiating a key exchange with the user equipment based on the PMK to establish a wireless local area network (WLAN) security association with the user equipment. According to one aspect, the method further comprises transmitting a security association confirmation message to the WWAN node indicating that the WLAN security association has been established with the user equipment after successful key exchange with the user equipment. According to another aspect, the user equipment identifier is media access control (MAC) address of the user equipment and the access point identifier is a MAC address of the access point.

According to one aspect, initializing the PMKSA further includes associating the PMK with a lifetime value of the PMK and an adaptive key management protocol. According to another aspect, the PMKID is generated based on an equation PMKID=Truncate-128(HMAC-SHA-256(PMK, STRING_0||access point identifier|| user equipment identifier)), where HMAC stands for "Hash-based Message Authentication Code," SHA stands for "Secure Hash Algorithm," and STRING_0 is a string. According to yet another aspect, the cryptographic key and the user equipment identifier is received from the WWAN node at a wireless termination point (WTP) of the apparatus. According to another aspect, generating the PMKID, storing the PMK and the PMKID, initializing the PMKSA, and determining that the PMKID received from the user equipment matches the PMKID stored is performed at the access point of the apparatus.

Another feature provides an apparatus comprising a memory circuit, a communication interface adapted to communicate with a wireless wide area network (WWAN) node and a user equipment, and a processing circuit communicatively coupled to the memory circuit and the communication interface, the processing circuit adapted to receive a user equipment identifier identifying the user equipment and a cryptographic key from the WWAN node, use the cryptographic key as a pairwise master key (PMK), generate a PMK identifier (PKMID) based on the PMK, store the PMK and the PMKID at the memory circuit, initialize a PMK security association (PMKSA) by associating the PMK with at least the PMKID and an access point identifier identifying an access point of the apparatus, receive an association request that includes a PMKID from the user equipment, determine that the PMKID received from the user equipment matches the PMKID stored at the memory circuit, and initialize a key exchange with the user equipment based on the PMK to establish a wireless local area network (WLAN) security association with the user equipment. According to one aspect, the processing circuit is further adapted to transmit a security association confirmation message to the WWAN node indicating that the WLAN security association has been established with the user equipment after successful key exchange with the user equipment. According to one aspect, the processing circuit is adapted to generate the PMKID, store the PMK and the PMKID, initialize the PMKSA, and determine that the PMKID received from the user equipment matches the PMKID stored at the memory circuit is performed at a processing circuit of the access point.

Another feature provides an apparatus comprising means for receiving a user equipment identifier identifying a user equipment and a cryptographic key from a wireless wide area network (WWAN) node, means for using the cryptographic key as a pairwise master key (PMK), means for generating a PMK identifier (PKMID) based on the PMK, means for storing the PMK and the PMKID, means for initializing a PMK security association (PMKSA) by associating the PMK with at least the PMKID and an access point identifier identifying an access point of the apparatus, means for receiving an association request that includes a PMKID from the user equipment, means for determining that the PMKID received from the user equipment matches the PMKID stored, and means for initiating a key exchange with the user equipment based on the PMK to establish a wireless local area network (WLAN) security association with the user equipment.

Another feature provides a non-transitory computer-readable storage medium having instructions stored thereon for secure wireless communication by an apparatus associated with a network, the instructions, which when executed by at least one processor, causes the processor to receive a user equipment identifier identifying a user equipment and a cryptographic key from a wireless wide area network (WWAN) node, use the cryptographic key as a pairwise master key (PMK), generate a PMK identifier (PKMID) based on the PMK, store the PMK and the PMKID, initialize a PMK security association (PMKSA) by associating the PMK with at least the PMKID and an access point identifier identifying an access point of the apparatus, receive an association request that includes a PMKID from the user equipment, determine that the PMKID received from the user equipment matches the PMKID stored, and initiate a key exchange with the user equipment based on the PMK to establish a wireless local area network (WLAN) security association with the user equipment.

Another feature provides a method for secure wireless communication at an apparatus associated with a network, the method comprising receiving a wireless local area network (WLAN) termination point addition request from a wireless wide area network (WWAN) node, the WLAN termination point addition request including a cryptographic key and a user equipment identifier identifying a user equipment, generating a network-generated first identifier based on the user equipment identifier and the cryptographic key received from the WWAN node, storing the network-generated first identifier at the apparatus and associating the network-generated first identifier with the cryptographic key, receiving an extensible authentication protocol (EAP) identity response from an access point associated with the network, the EAP identity response including a user equipment-generated first identifier, determining that the user equipment-generated first identifier corresponds to the stored network-generated first identifier, generating a master session key (MSK), and transmitting an EAP success message and the MSK to the access point. According to one aspect, the network-generated first identifier and the user equipment-generated first identifier are equal to SHA-256 (cryptographic key, user equipment identifier, STRING_0) where STRING_0 is an input string value. According to another aspect, the EAP identity response includes a realm value that identifies the apparatus receiving the user equipment-generated first identifier, the realm value further identifying a serving network identity of the WWAN node.

According to one aspect, the method further comprises transmitting a security association confirmation message to the WWAN node indicating that a WLAN security association has been established with the user equipment. According to another aspect, the method further comprises transmitting an EAP challenge message to the access point, the EAP challenge message destined for the user equipment and including a first random value, receiving an EAP challenge response message from the access point, the EAP challenge response message originating at the user equipment and including a second random value and an authentication value, verifying the EAP challenge response message using the authentication value, the first random value, and the second random value, and generating the MSK after verifying the EAP challenge response message. According to yet another aspect, verifying the EAP challenge response message includes generating an authentication response (AUTHRES) value at the apparatus equal to SHA-256(cryptographic key, first random value, second random value, STRING_1) where STRING_1 is an input string value, and determining that the AUTHRES value matches the authentication value received.

According to one aspect, the MSK equals SHA-256 (cryptographic key, first random value, second random value, STRING_2) where STRING_2 is an input string value. According to another aspect, the EAP challenge message transmitted to the access point is transmitted according to an authentication, authorization, and accounting (AAA) scheme, and the EAP challenge response message is received from the access point according to the authentication, authorization, and accounting (AAA) scheme.

Another feature provides an apparatus comprising a memory circuit, a communication interface adapted to communicate with a wireless wide area network (WWAN) node and an access point, and a processing circuit communicatively coupled to the memory circuit and the communication interface, the processing circuit adapted to receive a wireless local area network (WLAN) termination point addition request from the WWAN node, the WLAN termination point addition request including a cryptographic key and a user equipment identifier identifying a user equipment, generate a network-generated first identifier based on the user equipment identifier and the cryptographic key received from the WWAN node, store the network-generated first identifier at the memory circuit and associating the network-generated first identifier with the cryptographic key, receive an extensible authentication protocol (EAP) identity response from the access point, the EAP identity response including a user equipment-generated first identifier, determine that the user equipment-generated first identifier corresponds to the stored network-generated first identifier, generate a master session key (MSK), and transmit an EAP success message and the MSK to the access point. According to one aspect, the processing circuit is further adapted to transmit an EAP challenge message to the access point, the EAP challenge message destined for the user equipment and including a first random value, receive an EAP challenge response message from the access point, the EAP challenge response message originating at the user equipment and including a second random value and an authentication value, verify the EAP challenge response message using the authentication value, the first random value, and the second random value, and generate the MSK after verifying the EAP challenge response message.

According to one aspect, the processing circuit adapted to verify the EAP challenge response message includes the processing circuit adapted to generate an AUTHRES value at the apparatus equal to SHA-256(cryptographic key, first random value, second random value, STRING_1) where STRING_1 is an input string value and the first random value and the second random value are 128 bit values, and determine that the AUTHRES value matches the authentication value received.

Another feature provides an apparatus comprising means for receiving a wireless local area network (WLAN) termination point addition request from a wireless wide area network (WWAN) node, the WLAN termination point addition request including a cryptographic key and a user equipment identifier identifying a user equipment, means for generating a network-generated first identifier based on the user equipment identifier and the cryptographic key received from the WWAN node, means for storing the network-generated first identifier at the apparatus and associating the network-generated first identifier with the cryptographic key, means for receiving an extensible authentication protocol (EAP) identity response from an access point, the EAP identity response including a user equipment-generated first identifier, means for determining that the user equipment-generated first identifier corresponds to the stored network-generated first identifier, means for generating a master session key (MSK), and means for transmitting an EAP success message and the MSK to the access point. According to one aspect, the apparatus further comprises means for transmitting an EAP challenge message to the access point, the EAP challenge message destined for the user equipment and including a first random value, means for receiving an EAP challenge response message from the access point, the EAP challenge response message originating at the user equipment and including a second random value and an authentication value, means for verifying the EAP challenge response message using the authentication value, the first random value, and the second random value, and means for generating the MSK after verifying the EAP challenge response message.

Another feature provides a non-transitory computer-readable storage medium having instructions stored thereon for secure wireless communication by an apparatus associated with a network, the instructions, which when executed by at least one processor, causes the processor to receive a wireless local area network (WLAN) termination point addition request from a wireless wide area network (WWAN) node, the WLAN termination point addition request including a cryptographic key and a user equipment identifier identifying a user equipment, generate a network-generated first identifier based on the user equipment identifier and the cryptographic key received from the WWAN node, store the network-generated first identifier at the apparatus and associating the network-generated first identifier with the cryptographic key, receive an extensible authentication protocol (EAP) identity response from an access point associated with the network, the EAP identity response including a user equipment-generated first identifier, determine that the user equipment-generated first identifier corresponds to the stored network-generated first identifier, generate a master session key (MSK), and transmit an EAP success message and the MSK to the access point. According to one aspect, the instructions when executed by the processor further cause the processor to transmit an EAP challenge message to the access point, the EAP challenge message destined for the user equipment and including a first random value, receive an EAP challenge response message from the access point, the EAP challenge response message originating at the user equipment and including a second random value and an authentication value, verify the EAP challenge response message using the authentication value, the first random value, and the second random value, and generate the MSK after verifying the EAP challenge response message.

Another feature provides a method for secure wireless communication at an apparatus associated with a network, the method comprising receiving an association request from a user equipment that includes a pairwise master key identifier (PMKID), determining that no corresponding pairwise master key security association (PMKSA) associated with the PMKID is stored at the network, transmitting an extensible authentication protocol (EAP) identity request to the user equipment, receiving an EAP identity response that includes a user equipment-generated first identifier from the user equipment, transmitting the user equipment-generated first identifier to a wireless local area network (WLAN) termination point associated with the network, receiving a master session key (MSK) from the WLAN termination point, deriving a pairwise master key (PMK) from the MSK, and initiating a key exchange with the user equipment based on the PMK to establish a WLAN security association with the user equipment. According to one aspect, after transmitting the user equipment-generated first identifier to the WLAN termination point, the method further comprises receiving an EAP challenge message from the WLAN termination point that includes a first random value, transmitting the EAP challenge message to the user equipment, receiving an EAP challenge response message from the user equipment that includes a second random value and an authentication value, and transmitting the EAP challenge response message to the WLAN termination point.

Another feature provides an apparatus comprising a memory circuit, a communication interface adapted to communicate with a user equipment and a wireless local area network (WLAN) termination point, and a processing circuit communicatively coupled to the memory circuit and the communication interface, the processing circuit adapted to receive an association request from the user equipment that includes a pairwise master key identifier (PMKID), determine that no corresponding pairwise master key security association (PMKSA) associated with the PMKID is stored at the memory circuit, transmit an extensible authentication protocol (EAP) identity request to the user equipment, receive an EAP identity response that includes a user equipment-generated first identifier from the user equipment, transmit the user equipment-generated first identifier to the WLAN termination point, receive a master session key (MSK) from the WLAN termination point, derive a pairwise master key (PMK) from the MSK, and initiate a key exchange with the user equipment based on the PMK to establish a WLAN security association with the user equipment. According to one aspect, after the processing circuit transmits the user equipment-generated first identifier to the WLAN termination point, the processing circuit is further adapted to receive an EAP challenge message from the WLAN termination point that includes a first random value, transmit the EAP challenge message to the user equipment, receive an EAP challenge response message from the user equipment that includes a second random value and an authentication value, and transmit the EAP challenge response message to the WLAN termination point.

Another feature provides an apparatus comprising means for receiving an association request from a user equipment that includes a pairwise master key identifier (PMKID), means for determining that no corresponding pairwise master key security association (PMKSA) associated with the PMKID is stored at the apparatus, means for transmitting an extensible authentication protocol (EAP) identity request to the user equipment, means for receiving an EAP identity response that includes a user equipment-generated first identifier from the user equipment, means for transmitting the user equipment-generated first identifier to a wireless local area network (WLAN) termination point, means for receiving a master session key (MSK) from the WLAN termination point, means for deriving a pairwise master key (PMK) from the MSK, and means for initiating a key exchange with the user equipment based on the PMK to establish a WLAN security association with the user equipment. According to one aspect, the apparatus further comprises means for receiving an EAP challenge message from the WLAN termination point that includes a first random value after the user equipment-generated first identifier is transmitted to the WLAN termination point, means for transmitting the EAP challenge message to the user equipment, means for receiving an EAP challenge response message from the user equipment that includes a second random value and an authentication value, and means for transmitting the EAP challenge response message to the WLAN termination point.

Another feature provides a non-transitory computer-readable storage medium having instructions stored thereon for secure wireless communication by an apparatus associated with a network, the instructions, which when executed by at least one processor, causes the processor to receive an association request from a user equipment that includes a pairwise master key identifier (PMKID), determine that no corresponding pairwise master key security association (PMKSA) associated with the PMKID is stored at the network, transmit an extensible authentication protocol (EAP) identity request to the user equipment, receive an EAP identity response that includes a user equipment-generated first identifier from the user equipment, transmit the user equipment-generated first identifier to a wireless local area network (WLAN) termination point associated with the network, receive a master session key (MSK) from the WLAN termination point, derive a pairwise master key (PMK) from the MSK, and initiate a key exchange with the user equipment based on the PMK to establish a WLAN security association with the user equipment. According to one aspect, the instructions when executed by the processor further cause the processor to receive an EAP challenge message from the WLAN termination point that includes a first random value after the user equipment-generated first identifier is transmitted to the WLAN termination point, transmit the EAP challenge message to the user equipment, receive an EAP challenge response message from the user equipment that includes a second random value and an authentication value, transmit the EAP challenge response message to the WLAN termination point.

Another feature provides a method for secure wireless communications by a device, the method comprising obtaining a cryptographic key from a wireless wide area network (WWAN) security context, utilizing the cryptographic key as a pairwise master key (PMK) for a security association with an access point (AP) of a wireless local area network (WLAN), generating a PMK identifier (PMKID) based on the PMK, a device identifier identifying the device, and an access point identifier identifying the access point, transmitting an association request including the PMKID to the access point, and initiating a key exchange with the access point based on the PMK to establish a WLAN security association with the access point. According to one aspect, the device identifier is media access control (MAC) address of the device and the access point identifier is a MAC address of the access point. According to another aspect, the PMKID is generated based on an equation PMKID=Truncate-128(HMAC-SHA-256(PMK, STRING_0||access point identifier || device identifier)), where STRING_0 is an input string.

According to one aspect, prior to initiating the key exchange with the access point, the method further comprises receiving an association response from the AP indicating that a PMK security association (PMKSA) associated with the PMKID could not be found, receiving an EAP identity request from the AP, transmitting an EAP identity response in response to the EAP identity request, the EAP identity response including a device-generated first identifier based on the cryptographic key and the device identifier, receiving an EAP challenge message from the AP that includes a first random value, generating a second random value and an authentication value, the authentication value based on the cryptographic key, the first random value, and the second random value, and transmitting an EAP challenge response message to the AP that includes the authentication value and the second random value.

Another feature provides a device for secure wireless communication comprising a wireless communication interface, a processing circuit communicatively coupled to the wireless communication interface, the processing circuit adapted to obtain a cryptographic key from a wireless wide area network (WWAN) security context, utilize the cryptographic key as a pairwise master key (PMK) for a security association with an access point (AP) of a wireless local area network (WLAN), generate a PMK identifier (PMKID) based on the PMK, a device identifier identifying the device, and an access point identifier identifying the access point, transmit an association request including the PMKID to the access point, and initiate a key exchange with the access point based on the PMK to establish a WLAN security association with the access point. According to one aspect, prior to initiating the key exchange with the access point, the processing circuit is further adapted to receive an association response from the AP indicating that a PMK security association (PMKSA) associated with the PMKID could not be found, receive an EAP identity request from the AP, transmit an EAP identity response in response to the EAP identity request, the EAP identity response including a device-generated first identifier based on the cryptographic key and the device identifier, receive an EAP challenge message from the AP that includes a first random value, generate a second random value and an authentication value, the authentication value based on the cryptographic key, the first random value, and the second random value, and transmit an EAP challenge response message to the AP that includes the authentication value and the second random value.

Another feature provides a device for secure wireless communication comprising means for obtaining a cryptographic key from a wireless wide area network (WWAN) security context, means for utilizing the cryptographic key as a pairwise master key (PMK) for a security association with an access point (AP) of a wireless local area network (WLAN), means for generating a PMK identifier (PMKID) based on the PMK, a device identifier identifying the device, and an access point identifier identifying the access point, means for transmitting an association request including the PMKID to the access point, and means for initiating a key exchange with the access point based on the PMK to establish a WLAN security association with the access point. According to one aspect, the device further comprises means for receiving an association response from the AP indicating that a PMK security association (PMKSA) associated with the PMKID could not be found, means for receiving an EAP identity request from the AP, means for transmitting an EAP identity response in response to the EAP identity request, the EAP identity response including a device-generated first identifier based on the cryptographic key and the device identifier, means for receiving an EAP challenge message from the AP that includes a first random value, means for generating a second random value and an authentication value, the authentication value based on the cryptographic key, the first random value, and the second random value, and means for transmitting an EAP challenge response message to the AP that includes the authentication value and the second random value.

Another feature provides a non-transitory computer-readable storage medium having instructions for secure wireless communication by a device stored thereon, the instructions, which when executed by at least one processor, causes the processor to obtaining a cryptographic key from a wireless wide area network (WWAN) security context, utilizing the cryptographic key as a pairwise master key (PMK) for a security association with an access point (AP) of a wireless local area network (WLAN), generating a PMK identifier (PMKID) based on the PMK, a device identifier identifying the device, and an access point identifier identifying the access point, transmitting an association request including the PMKID to the access point, and initiating a key exchange with the access point based on the PMK to establish a WLAN security association with the access point. According to one aspect, the instructions when executed by the processor further cause the processor to receive an association response from the AP indicating that a PMK security association (PMKSA) associated with the PMKID could not be found, receive an EAP identity request from the AP, transmit an EAP identity response in response to the EAP identity request, the EAP identity response including a device-generated first identifier based on the cryptographic key and the device identifier, receive an EAP challenge message from the AP that includes a first random value, generate a second random value and an authentication value, the authentication value based on the cryptographic key, the first random value, and the second random value, and transmit an EAP challenge response message to the AP that includes the authentication value and the second random value.

BRIEF DESCRIPTION OF DRAWINGS

FIGS. 5A and 5B illustrate a first exemplary process flow diagram of a WLAN security association involving the UE/STA, WLAN, and eNB.

DETAILED DESCRIPTION

Figure 1:
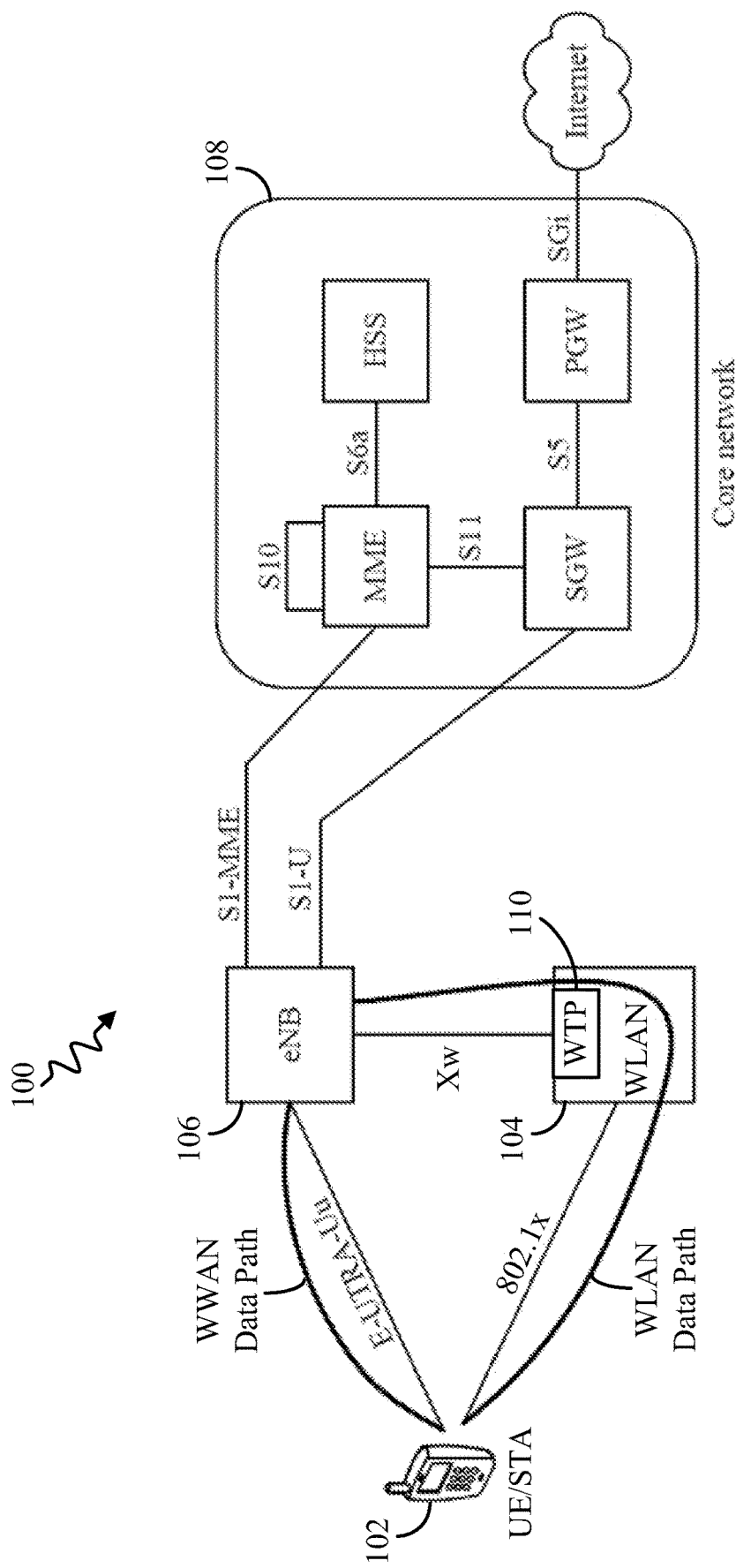
FIG. 1 illustrates a schematic block diagram of an exemplary non-collocated deployment of a communication system utilizing LWA that features the WWAN-WLAN aggregation security features and methods described herein.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, an aspect is an implementation or example. Reference in the specification to "an aspect," "one aspect," "some aspects," "various aspects," or "other aspects" means that a particular feature, structure, or characteristic described in connection with the aspects is included in at least some aspects, but not necessarily all aspects, of the present techniques. The various appearances of "an aspect," "one aspect," or "some aspects" are not necessarily all referring to the same aspects. Elements or aspects from an aspect can be combined with elements or aspects of another aspect.

In the following description and claims, the term "coupled" may mean that two or more elements are in direct physical or electrical contact. However, "coupled" may also mean that two or more elements are not in direct contact with each other, but yet still co-operate or interact with each other.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 illustrates a schematic block diagram of an exemplary non-collocated deployment of a communication system 100 utilizing LWA that features the WWAN-WLAN aggregation security features and methods described herein according to one aspect. The system 100 includes a user equipment (UE) 102, a WLAN 104, and an eNode B (eNB) 106 coupled to a cellular core network 108. The UE 102 includes station capability in that it may allow the UE 102 to perform operations as those performed by a conventional station (STA) in a WLAN. Consequently, in the following discussion this functionality may be referred to as a "STA within a UE" and the terms "STA" and "UE" may be used to refer to the same device.

As shown in FIG. 1, the UE 102 may be connected to an eNB 106 of the WWAN and transmit and receive data from it along the WWAN data path. Moreover, the UE 102 may be connected to one or more access points (APs) (not shown in FIG. 1) of the WLAN 104 and transmit and receive data from it along the WLAN data path.

The eNB 106 is the anchor node for both data and control planes and controls packet scheduling for both the WWAN and WLAN links. The eNB 106 communicates with the WLAN termination point (WTP) 110 of the WLAN 104 through the Xw communication interface (e.g., Xw-C control and Xw-U user). The eNB 106 also connects to the core network (CN) via regular S1 interfaces (S1-C and S1-U) to transmit and receive control and user data.

Figure 2:
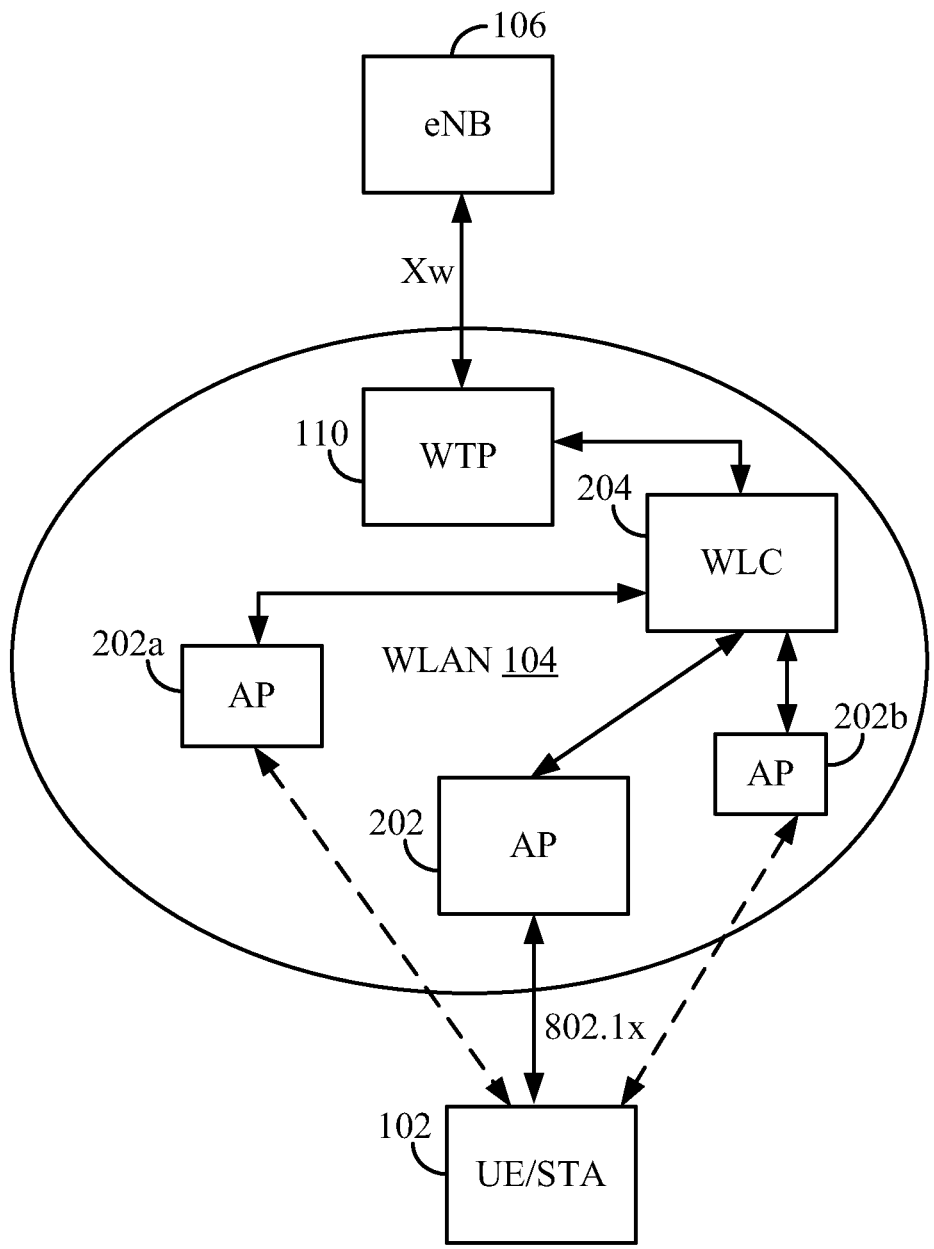
FIG. 2 illustrates a schematic block diagram of an exemplary WLAN.

FIG. 2 illustrates a schematic block diagram of an exemplary WLAN 104 according to one aspect. As described above, the STA 102 communicates with one or more APs 202, 202a, 202b associated with the WLAN 104, and the eNB 106 communicates with a WTP 110 of the WLAN 104. In the non-limiting example shown, the WLAN 104 includes a plurality of APs 202, 202a, 202b that may be communicatively coupled to a WLAN controller (WLC) 204, which in turn is communicatively coupled to the WTP 110. The example shown in FIG. 2 is merely exemplary. In other aspects, the WLAN 104 may comprise a single AP 202 that is either communicatively coupled to a WTP 110 or is itself both an access point and a WLAN termination point. Moreover, the APs 202, 202a, 202b shown in FIG. 2 and discussed herein may be either LWA aware APs (e.g., APs capable of pairwise master key (PMK) caching) or 802.1x APs (e.g., "legacy APs") as specified below. For simplicity and as referenced below, one AP 202a may be considered an LWA aware AP capable of PMK caching and another AP 202b may be considered a legacy AP.

Figure 3:
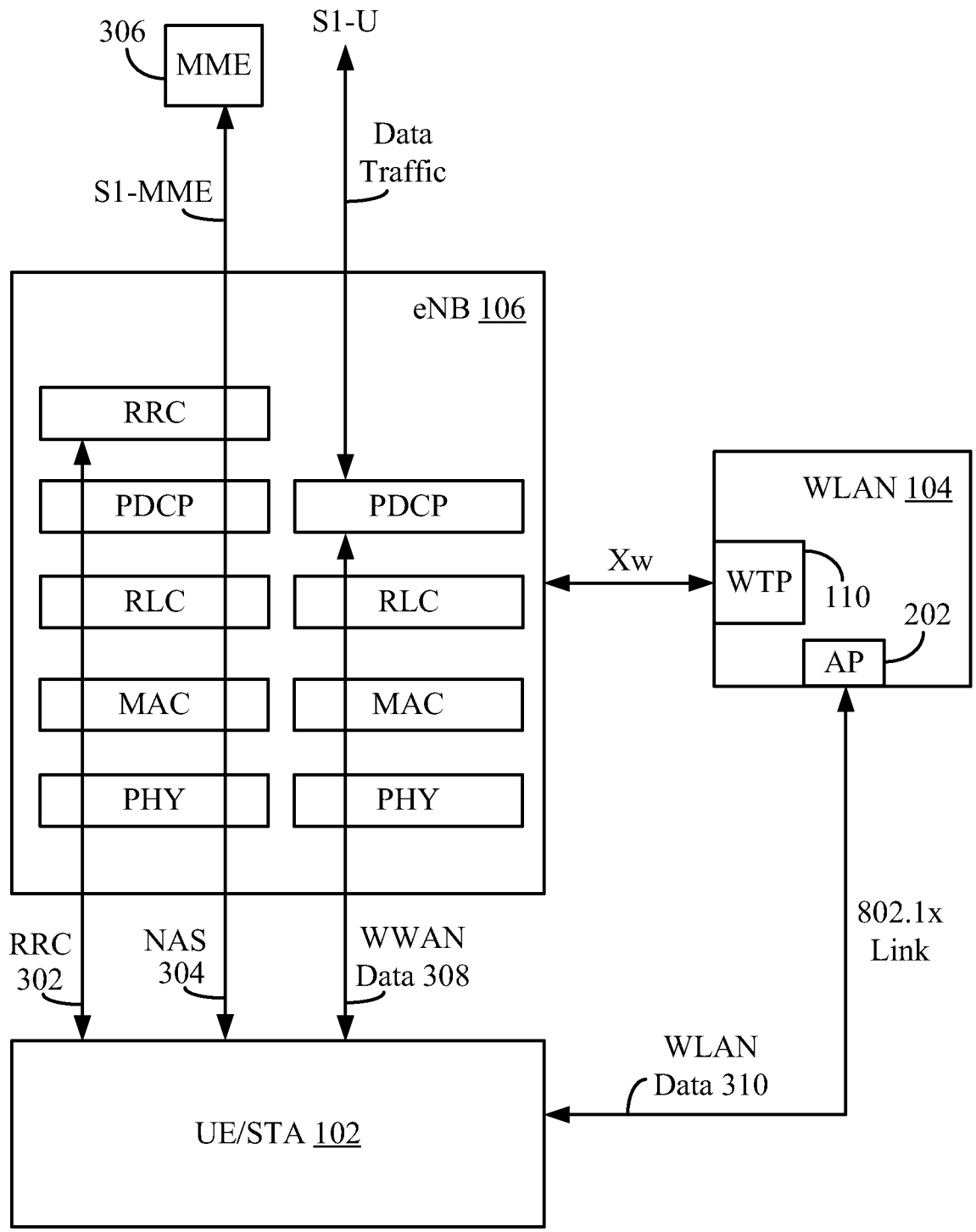
FIG. 3 illustrates a conceptual protocol stack of the LWA capable communication system.

FIG. 3 illustrates a conceptual protocol stack of the LWA capable communication system according to one aspect. As shown in FIG. 3, the LTE Radio Resource Control channel (RRC channel) 302 and the LTE Non-Access Stratum (NAS) control channel 304 are maintained between the UE 102 and the eNB 106 (e.g., MeNB) and MME 306. WWAN (e.g., LTE) user data 308 from the UE 102 and WLAN user data 310 is aggregated at the packet data convergence protocol (PDCP) layer.

Referring to FIGS. 1-3, an initial WLAN association may use a key $S\text{-}K_{WT}$ (e.g., hereinafter may be "cryptographic key") generated from a current WWAN security context (e.g., LTE security context). In one aspect, the key $S\text{-}K_{WT}$ may be a 256 bit key that is derived from the eNB key of the LTE security context. The STA 102 may obtain the key $S\text{-}K_{WT}$ from the WWAN stack (e.g., LTE stack) of the UE 102. The eNB 106 may provide the key $S\text{-}K_{WT}$ to the WLAN's WTP 110 via the Xw communication interface. The key $S\text{-}K_{WT}$ may then be used as the pairwise master key (PMK) by the UE/STA 102 and the WLAN 104 as part of a 4-way key exchange handshake to establish a secure connection between the UE/STA 102 and the WLAN 104.

Figure 4:
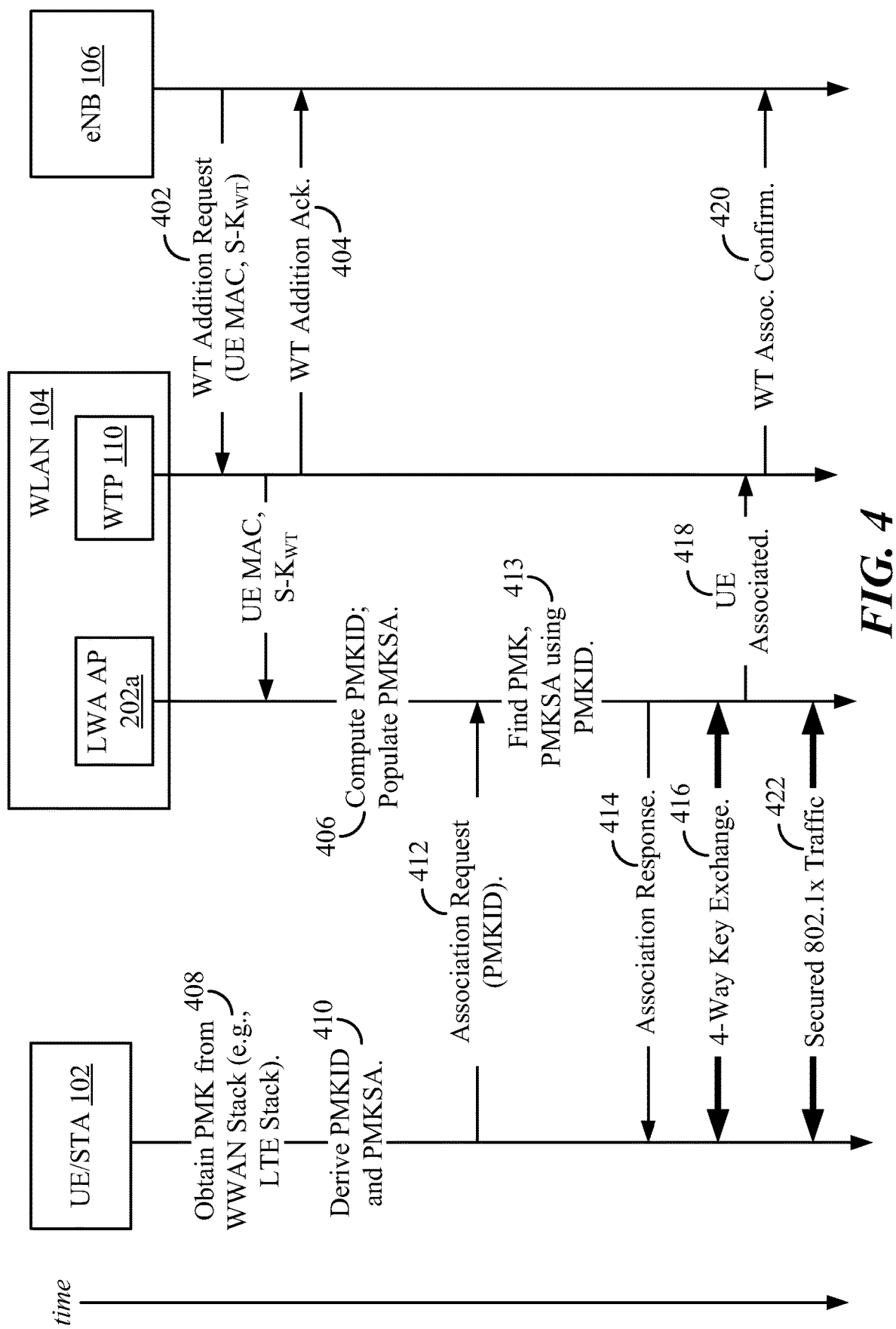
FIG. 4 illustrates a process flow diagram of a WLAN security association involving the UE/STA, WLAN, and eNB.

FIG. 4 illustrates a process flow diagram of a WLAN security association involving the UE/STA 102, WLAN 104, and eNB 106 according to one aspect of the disclosure. In the illustrated example, the WLAN's AP 202a is an LWA aware access point in that it is capable of receiving a key (e.g., $S\text{-}K_{WT}$) from an out of band source and using it as the pairwise master key (PMK) for the security association. This is different from traditional APs and STAs where the PMK and the associated PMK security association (PMKSA) are created as a result of successful EAP authentication. That is, the PMK and PMKSA may be created without needing to perform an 802.1x specific authentication procedure. In one aspect, the AP 202a and WTP 110 shown in FIG. 4 may be one single device that includes the functions of both the access point and the wireless termination point.

Furthermore, the eNB 106 may select a candidate WLAN service set for data radio bearer offload based on WLAN measurements received from the UE 102. Upon receiving a command from the eNB 106 to offload one or more data radio bearers (e.g., LTE data radio bearers), the UE 102 may select one of the APs from the WLAN service set received from the eNB 106. The selection may be based on the received signal strength indicator (RSSI) of the AP 202a or some other UE implementation specific criteria. The UE 102 may also obtain the AP's MAC address for initializing the PMKSA either from a message broadcast by the AP 202a or by sending a probe request.

Referring to FIG. 4, the eNB 106 may transmit 402 a WTP addition request message to the WLAN's termination point 110. The WTP addition request message may include a UE identifier (e.g., the UE MAC address) and the key $S\text{-}K_{WT}$. Next, the WTP 110 responds 404 with a WTP addition acknowledgment message that acknowledges successful receipt of the WTP addition request message. The key $S\text{-}K_{WT}$ may then be used by the AP 202a as the PMK for the WLAN security association. The AP 202a generates 406 the PMK identifier (PMKID) based on the PMK according to, for example, PMKID=Truncate-128(HMAC-SHA-256 (PMK, STRING_0|AA|SPA)) where "AA" is the AP MAC address, "SPA" is the UE MAC address, and "STRING_0" is an arbitrary input string. The AP 202a also populates (e.g., initializes) the PMK security association (PMKSA) by associating the stored PMK with the AP's MAC address, the lifetime of the PMK, the adaptive key management protocol (AKMP), the PMKID, and/or other authorization information (e.g., SSID).

Upon receiving a connection reconfiguration command (e.g., an RRC_Connection_Reconfiguration command) from the eNB 106, the UE 102 obtains 408 the PMK (e.g., UE obtains S-$K_{WT}$ and PMK:=S-$K_{WT}$) from the WWAN stack (e.g., LTE stack) and derives 410 the PMKID and PMKSA based on the PMK. The connection reconfiguration command may include WLAN identification information with one or more of the BSSID/HESSID/ESSID from the eNB 106 to offload certain data radio bearers to the identified WLAN. These actions 408, 410 at the UE 102 may be performed independent to the actions 402, 404, 406 taking place at the WLAN 104 and eNB 106.

Subsequently, the UE 102 may transmit an association request 412 to the AP 202a that includes the PMKID. The AP 202a uses the PMKID to find 413 the PMKSA and PMK associated with the UE 102 and sends back 414 an association response. After that the UE 102 and the AP 202a may engage 416 in a 4-way key exchange handshake using the PMK. After successful association a UE associated message may be transmitted 418 to the WTP 110, which in turn transmits 420 a WTP associated message to the eNB 106. The UE associated message and the corresponding WTP associated message allow the eNB 106 to know that the UE 102 has successfully connected to the WLAN 104 and that it may now begin offloading traffic (e.g., data radio bearers (DRBs)) over onto the WLAN 104. The AP 202a and UE 102 may also begin transmitting and receiving 422 secured communications based on 802.1x.

Figure 5B:
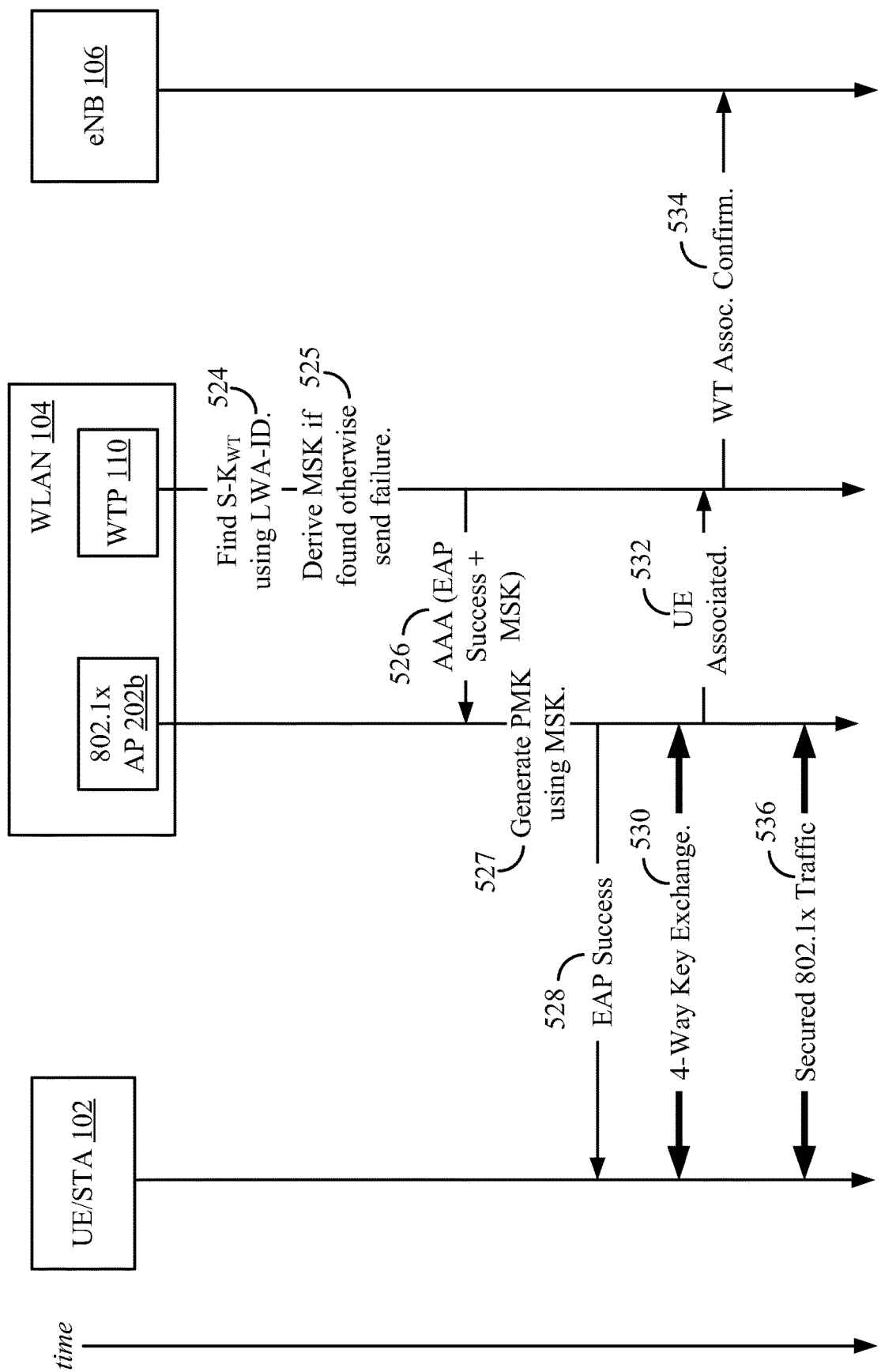

FIGS. 5A and 5B illustrate a process flow diagram of a WLAN security association involving the UE/STA 102, WLAN 104, and eNB 106 according to another aspect of the disclosure. In the illustrated example, the AP 202b is a legacy access point (i.e., 802.1x access point) that does not support PMKSA creation from a PMK received out of band. First, the eNB 106 transmits 502 a WTP addition request message to the WLAN termination point 110 of the WLAN 104. The WTP addition request message may include the UE MAC address and the key S-$K_{WT}$. Next, the WTP 110 responds 504 with a WTP addition acknowledgment message that acknowledges successful receipt of the WTP addition request message. The key S-$K_{WT}$ and the UE MAC address may then be used 506 by the WTP 110 to generate a first identifier LWA-ID (e.g., "network-generated first identifier"). According to just one example, LWA-ID may be a function of the key S-$K_{WT}$ and the UE MAC address. For instance, LWA-ID=KDF(S-$K_{WT}$, UE MAC address, STRING_0) where KDF is a key derivation function (e.g., one way function such as SHA256, etc.) and STRING_0 may be an arbitrary input string value.

Upon receiving an RRCConnectionReconfiguration command from the eNB 106, the UE 102 obtains 508 the PMK (e.g., UE obtains S-$K_{WT}$ and PMK:=S-$K_{WT}$) from the WWAN stack (e.g., LTE stack) and derives the PMKID based on the PMK. This action 508 at the UE 102 may be performed independent to the actions 502, 504, 506 taking place at the WLAN 104 and eNB 106. Subsequently, the UE 102 may transmit an association request 510 to the AP 202b that includes the PMKID. Since the AP 202b is a legacy access point it does not have the associated PMKSA of the UE 102. Therefore the AP 202b determines 512 that no PMKSA is found and returns 514 a corresponding response (e.g., no PMKSA found) to the UE 102.

Not finding the PMKSA also prompts the AP 202b to start an Extensible Authentication Protocol (EAP) with the UE 102 by sending 516 an EAP identity request message to the UE 102. The UE 102 then generates 518 LWA-ID (e.g., "user equipment-generated first identifier"), which according to just one example may be equal to KDF(S-$K_{WT}$, UE MAC address, STRING_0). The UE 102 sends the generated LWA-ID as 520 an EAP identity response with LWA-ID@realm (e.g., "first value") as the EAP peer identity to the AP 202b. In another aspect, the LWA-ID may be generated by the UE 102 before receipt of EAP identity request message (e.g., when PMKID is generated 508).

Here, "realm" signifies the serving network identity of the eNB 106. It may either identify the eNB 106 (e.g., Physical cell ID of the eNB 106) and/or the public land mobile network (PLMN) identity associated with the eNB 106 or both. In other words, "realm" identifies the WTP 110 that the UE 102 wants the AP 202b to route the authentication request to. For example, the realm value may be defined as realm=lwa.wtid<WTID>.mnc<MNC>.mcc<MCC> 0.3gppnetwork.org, where the mobile network code (MNC), and the mobile country code (MCC) may be obtained from the serving network PLMN identity of the eNB/MME. WTID is an identifier identifying the eNB 106 (e.g., E-UTRAN cell identity (ECI) of the eNB). The WWAN stack (e.g., LTE stack) provides the UE 102 with the WTID, MNC, and MCC. It should be appreciated that using "realm" enables a WLAN network with different WTPs to serve multiple serving networks. For example, a WLAN network may support traffic offload by different eNBs belonging to different PLMN operators or different eNBs belonging to the same PLMN operators.

The EAP identity response message with identity LWA-ID@realm is then forwarded 522 by the AP 202b to the WTP 110 identified by the "realm" part of the identity under an authentication, authorization, and accounting (AAA) scheme. The WTP 110 takes the role of an EAP Authentication Server (AS) and may use the received value LWA-ID to find 524 the key S-$K_{WT}$ associated with the UE 102. If found, the WTP 110 generates 525 a master session key (MSK) and then transmits 526 an EAP success message along with the MSK to the AP 202b. If on the other hand, the received LWA-ID is not associated with a stored LWA-ID then an EAP failure message may instead be transmitted.

According to one aspect, the WTP 110 may generate the MSK by concatenating the S-$K_{WT}$ with itself (i.e., MSK=S-$K_{WT}$|S-$K_{WT}$) and then send the MSK along with the EAP success message to the AP 202b. Since, the AP 202b now has the MSK it may generate 527 the PMK (e.g., PMK:=the first half of bits of MSK) and transmit 528 an EAP success message to the UE 102, thus successfully authenticating the UE 102. After that the UE 102 and the AP 202b may engage 530 in a 4-way key exchange handshake using the PMK. After successful association a UE associated message may be transmitted 532 to the WTP 110, which in turn transmits 534 a WTP associated message to the eNB 106. The AP 202b and UE 102 may also begin transmitting and receiving 536 secured communications based on 802.1x.

Figure 6A:
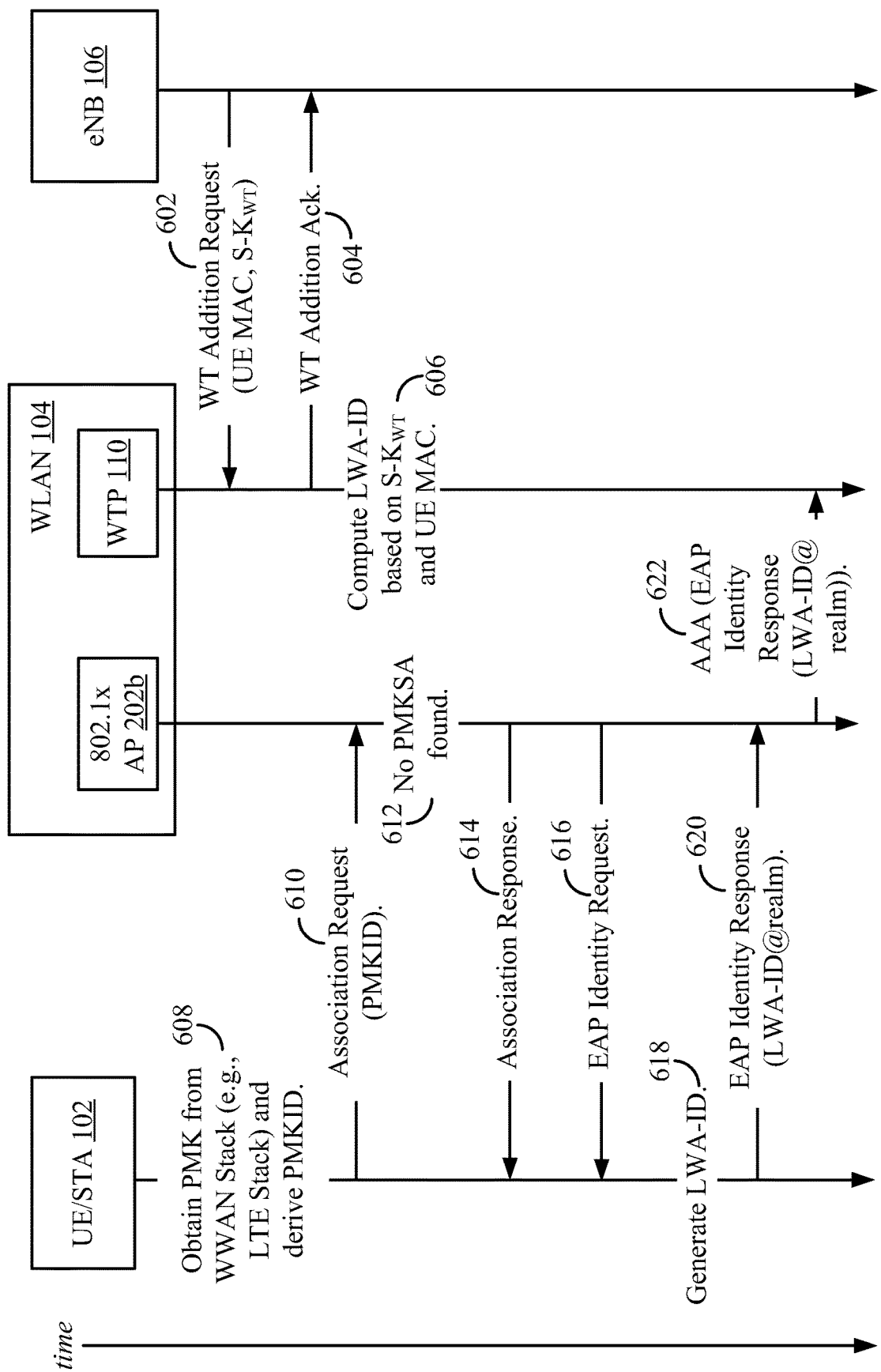
FIGS. 6A and 6B illustrate a second exemplary process flow diagram of a WLAN security association involving the UE/STA, WLAN, and eNB.
Figure 6B:
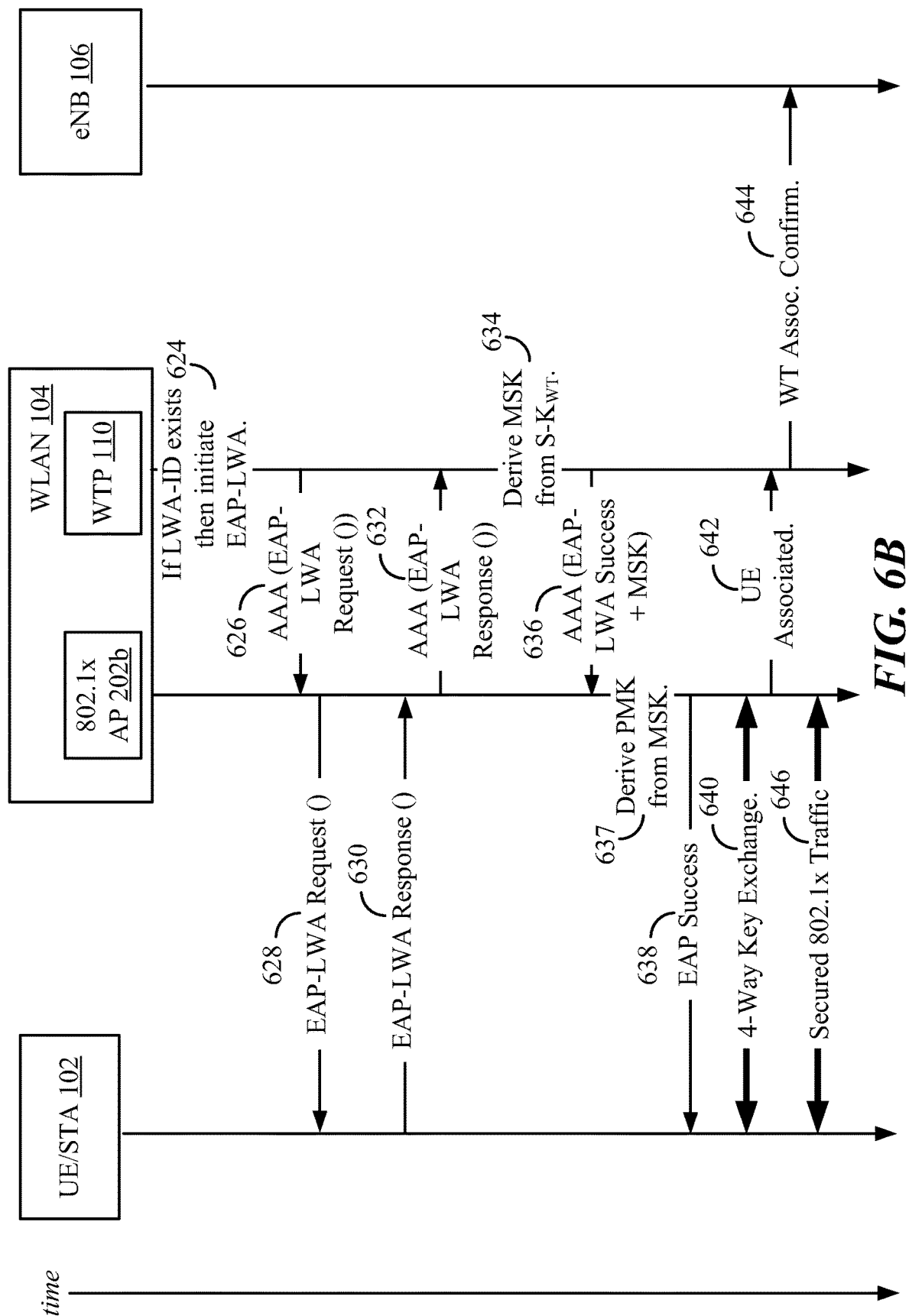

FIGS. 6A and 6B illustrate a process flow diagram of a WLAN security association involving the UE/STA 102, WLAN 104, and eNB 106 according to another aspect of the disclosure. In the illustrated example, the AP 202b is a legacy access point (i.e., 802.1x access point) that does not support PMKSA creation from a PMK received out of band. First, the eNB 106 transmits 602 a WTP addition request message to the WLAN termination point 110 of the WLAN 104. The WTP addition request message may include the UE MAC address and the key S-$K_{WT}$. Next, the WTP 110 responds 604 with a WTP addition acknowledgment message that acknowledges successful receipt of the WTP addition request message. The key S-$K_{WT}$ and the UE MAC address may then be used 606 by the WTP 110 to generate the value LWA-ID (e.g., "network-generated first identifier"). According to just one example, LWA-ID may be a function of the key S-$K_{WT}$ and the UE MAC address. For instance, LWA-ID=KDF(S-$K_{WT}$, UE MAC address, STRING_0) where KDF is a key derivation function (e.g., one way function such as SHA256, etc.) and STRING0 may be an arbitrary input string value.

Upon receiving an RRCConnectionReconfiguration command, the UE 102 obtains 608 the PMK (e.g., UE obtains S-$K_{WT}$ and PMK:=S-$K_{WT}$) from the WWAN stack and derives the PMKID itself based on the PMK. This action 608 at the UE 102 may be performed independent to the actions 602, 604, 606 taking place at the WLAN 104 and eNB 106. Subsequently, the UE 102 may transmit an association request 610 to the AP 202b that includes the PMKID. Since the AP 202b is a legacy access point it does not have the associated PMKSA of the UE 102. Therefore it determines 612 that no PMKSA is found and returns 614 a corresponding response (e.g., no PMKSA found) to the UE 102.

Not finding the PMKSA also prompts the AP 202b to start the Extensible Authentication Protocol (EAP) with the UE 102 by sending 616 an EAP identity request message. The UE 102 then generates 618 the value LWA-ID (e.g., "user equipment-generated first identifier"), which according to just one example may be equal to KDF(S-$K_{WT}$, UE MAC address, STRING_0), and sends 620 an EAP identity response LWA-ID@realm to the AP 202b. In another aspect, the LWA-ID may be generated by the UE 102 before receipt of EAP identity request message (e.g., when PMKID is generated).

As discussed above "realm" signifies the serving network identity of the eNB 106 and may either identify the eNB 106 or the PLMN identity associated with the eNB 106. Using "realm" enables a WLAN network to serve multiple serving networks such as a WLAN network supporting traffic offload by different eNBs belonging to different PLMN operators or different eNBs belonging to the same PLMN operators.

The EAP identity response message LWA-ID@realm is then forwarded 622 to the WTP 110 under an AAA scheme. The WTP 110 next determines whether it has an LWA-ID stored that matches the one received from the AP 202b. If it does it initiates 624 an LWA-specific EAP authentication protocol (herein after referred to as "EAP-LWA" authentication protocol), otherwise it returns an EAP failure notification to the AP 202b and UE 102. The benefit of initiating an LWA-specific EAP authentication protocol, such as EAP-LWA, is to maintain compliance with the existing EAP state machine where an EAP peer (i.e., UE 102) may expect receipt of an EAP authentication method specific message exchange before EAP success may be accepted by the peer. According to one aspect, once the EAP-LWA is initiated the WTP 110 transmits 626 an EAP-LWA Request ( ) message to the AP 202b, which in turn forwards 628 it to the UE 102. The UE 102 responds 630 with an EAP-LWA Response ( ) message to AP 202b, which in turn forwards 632 it back to the WTP 110.

At this point the WTP 110 derives 634 the MSK from the S-$K_{WT}$ by, for example, concatenating the S-$K_{WT}$ with itself (i.e., MSK=S-$K_{WT}$|S-$K_{WT}$). The WTP 110 then sends 636 an EAP-LWA success message along with the MSK to the AP 202b. (These messages 626, 628, 630, 632, 636 may be exchanged under an AAA scheme with the WTP 110 acting as an authentication server.) Since, the AP 202b now has the MSK it may generate 637 the PMK (e.g., PMK:=the first half of bits of MSK) and transmit 638 an EAP success message to the UE 102. After that the UE 102 and the AP 202b may engage 640 in a 4-way key exchange handshake using the PMK. After successful association a UE associated message may be transmitted 642 to the WTP 110, which in turn transmits 644 a WTP associated message to the eNB 106. The AP 202b and UE 102 may also begin transmitting and receiving 646 secured communications based on 802.1x.

Figure 7A:
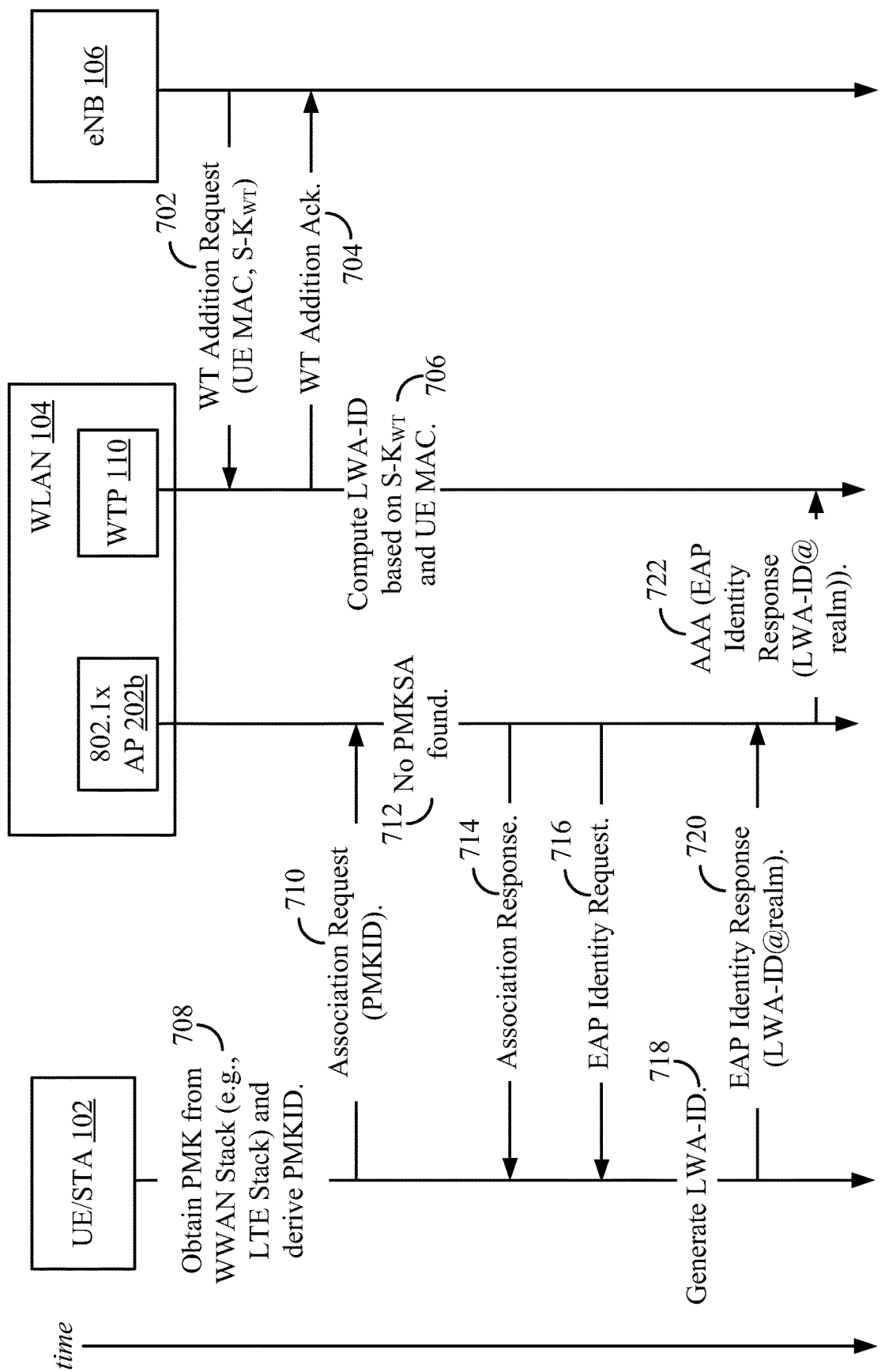
FIGS. 7A, 7B, and 7C illustrate a third exemplary process flow diagram of a WLAN security association involving the UE/STA, WLAN, and eNB.
Figure 7B:
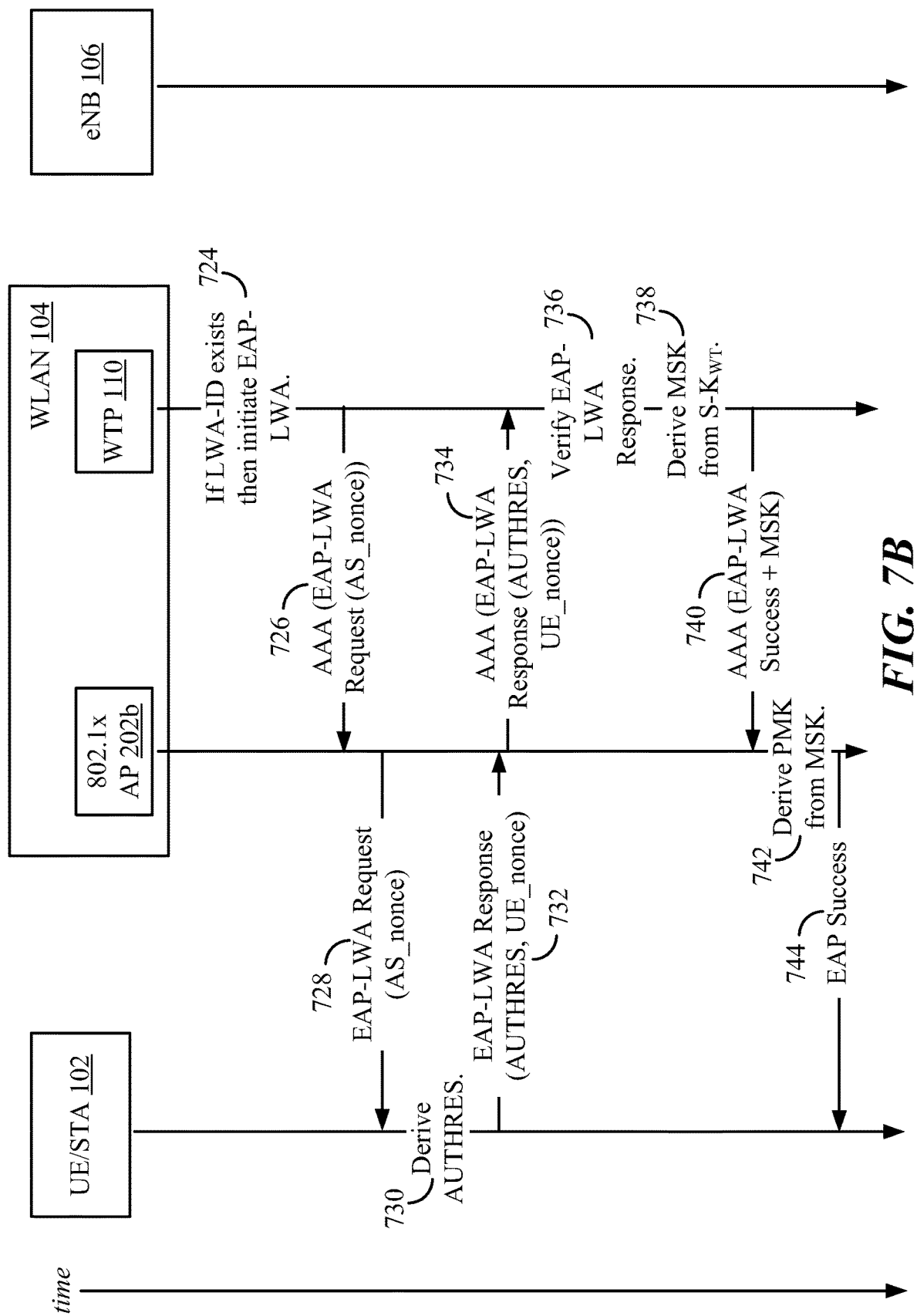
Figure 7C:
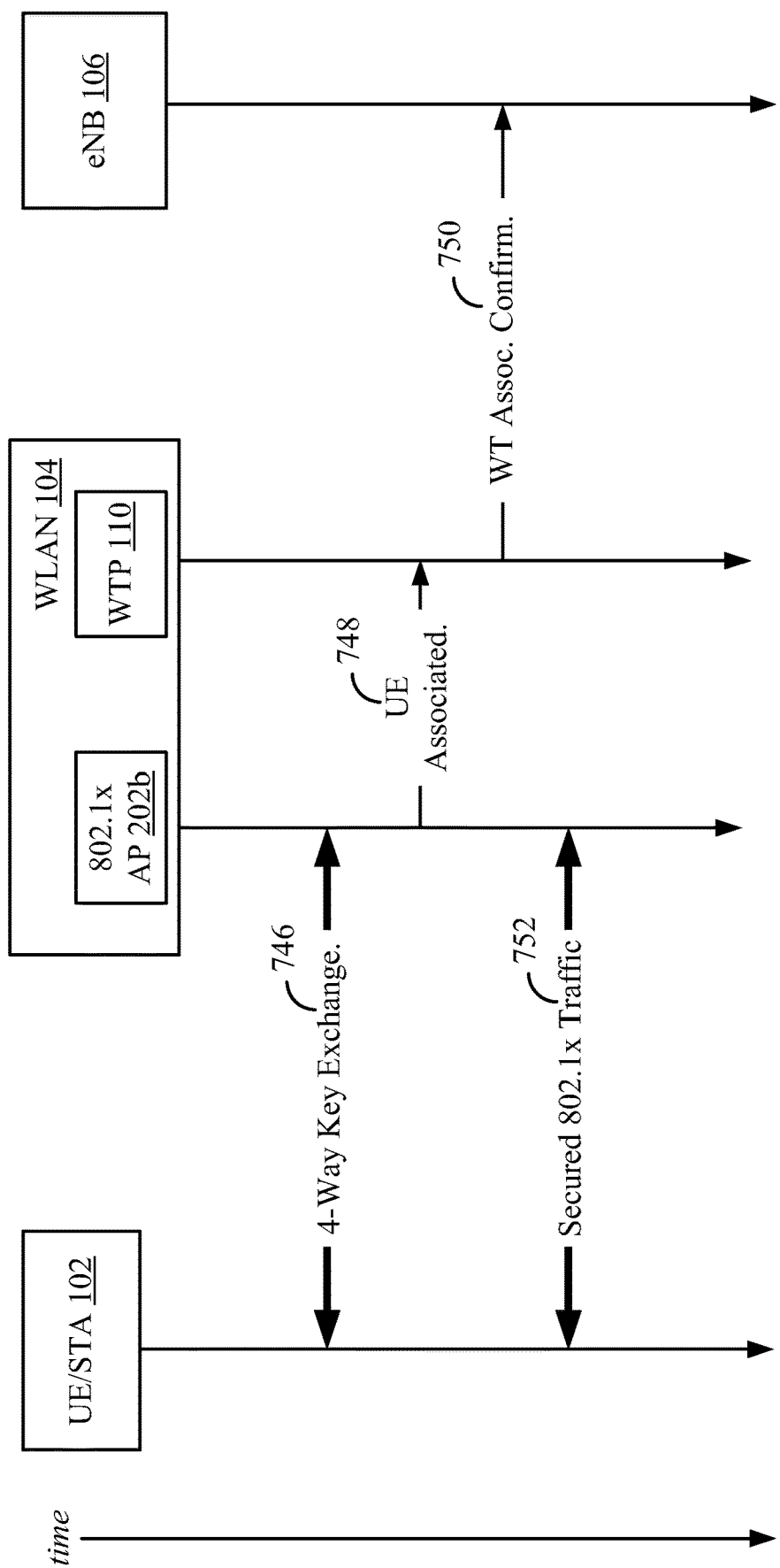

FIGS. 7A, 7B, and 7C illustrate a process flow diagram of a WLAN security association involving the UE/STA 102, WLAN 104, and eNB 106 according to yet another aspect of the disclosure. In the illustrated example, the AP 202b is a legacy access point (i.e., 802.1x access point) that does not support PMKSA creation from a PMK received out of band. First, the eNB 106 transmits 702 a WTP addition request message to the WLAN termination point 110 of the WLAN 104. The WTP addition request message may include the UE MAC address and the key S-$K_{WT}$. Next, the WTP 110 responds 704 with a WTP addition acknowledgment message that acknowledges successful receipt of the WTP addition request message. The key S-$K_{WT}$ and the UE MAC address may then be used 706 by the WTP 110 to generate the value LWA-ID (e.g., "network-generated first identifier"). According to just one example, LWA-ID may be a function of the key S-$K_{WT}$ and the UE MAC address. For instance, LWA-ID=KDF(S-$K_{WT}$, UE MAC address, STRING_0) where KDF is a key derivation function (e.g., one way function such as SHA256, etc.) and STRING_0 is an arbitrary input string value. The WTP 110 also associates the value LWA-ID with the cryptographic key S-$K_{WT}$ received.

Upon receiving an RRCConnectionReconfiguration command, the UE 102 obtains 708 the PMK (e.g., UE obtains S-$K_{WT}$ and PMK:=S-$K_{WT}$) from the WWAN stack and derives the PMKID itself based on the PMK. This action 708 at the UE 102 may be performed independent to the actions 702, 704, 706 taking place at the WLAN 104 and eNB 106. Subsequently, the UE 102 may transmit an association request 710 to the AP 202b that includes the PMKID. Since the AP 202b is a legacy access point it does not have the PMKSA associated with the PMKID or the UE 102. Therefore it determines 712 that no PMKSA is found associated with the PMKID received and returns 714 a corresponding response (e.g., no PMKSA found) to the UE 102 that omits the PMKID.

Not finding the PMKSA also prompts the AP 202b to start the Extensible Authentication Protocol (EAP) with the UE 102 by sending 716 an EAP identity request message. The UE 102 then generates 718 the value LWA-ID (e.g., "user equipment-generated first identifier"), which according to just one example may be equal to KDF(S-$K_{WT}$, UE MAC address, STRING_0), and sends 720 an EAP identity response LWA-ID@realm to the AP 202b. In another aspect, the LWA-ID may be generated by the UE 102 before receipt of EAP identity request message (e.g., when PMKID is generated).

As discussed above "realm" signifies the serving network identity of the eNB 106 and may either identify the eNB 106 or the PLMN identity associated with the eNB 106. Using "realm" enables a WLAN network to serve multiple serving networks such as a WLAN network supporting traffic offload by different eNBs belonging to different PLMN operators or different eNBs belonging to the same PLMN operators.

The EAP identity response message LWA-ID@realm is then forwarded 722 to the WTP 110 under an AAA scheme. The WTP 110 next determines whether it has an LWA-ID stored that matches the one received from the AP 202b. If it does it initiates 724 an EAP-LWA authentication protocol, otherwise it returns an EAP failure notification to the AP 202b and UE 102. The benefit of initiating an LWA-specific EAP authentication protocol, such as EAP-LWA, is to maintain compliance with the existing EAP state machine where an EAP peer (i.e., UE 102) may expect receipt of an EAP authentication method specific message exchange before EAP success may be accepted by the peer. According to one aspect, once the EAP-LWA is initiated the WTP 110 transmits 726 an EAP-LWA Request (AS_nonce) message that includes the random value AS_nonce (number used once) to the AP 202b, which in turn forwards 728 it to the UE 102. The UE 102 then generates its own random value UE_nonce and derives 730 the value AUTHRES=KDF(S-$K_{WT}$, AS_nonce, UE_nonce, STRING_1), where KDF is a key derivation function and STRING_1 may be an arbitrary input string. The UE 102 then responds 732 with an EAP-LWA Response (AUTHRES, UE_nonce) message that includes AUTHRES and UE_nonce to AP 202b, which in turn forwards 734 it to the WTP 110.

The WTP 110 then generates its own AUTHRES value using the same KDF, STRING_1, the received UE_nonce, and its own locally stored AS_nonce and S-$K_{WT}$. By determining that the AUTHRES value the WTP 110 generated matches the AUTHRES value it received from the AP/UE, the EAP-LWA response is verified 736 and the UE/STA 102 is authenticated. These messages 726, 728, 730, 732, 736 may be exchanged under an AAA scheme with the WTP 110 acting as an authentication server.

At this point the WTP 110 derives 738 the MSK from the S-$K_{WT}$ by, for example, concatenating the S-$K_{WT}$ with itself (i.e., MSK=S-$K_{WT}$|S-$K_{WT}$). The WTP 110 then sends 740 an EAP-LWA success message along with the MSK to the AP 202b. Since, the AP 202b now has the MSK it may generate 742 the PMK (e.g., PMK:=the first half of bits of MSK) and transmit 744 an EAP success message to the UE 102. After that the UE 102 and the AP 202b may engage 746 in a 4-way key exchange handshake using the PMK. After successful association a UE associated message may be transmitted 748 to the WTP 110, which in turn transmits 750 a WTP associated message to the eNB 106. The AP 202b and UE 102 may also begin transmitting and receiving 752 secured communications based on 802.1x. In another aspect, the MSK may be derived using a KDF, such as MSK=KDF(S-Kwt, AS_nonce, UE_nonce, STRING_2) instead of MSK=PMK|PMK, where STRING_2 is an arbitrary input string.

Figure 8:
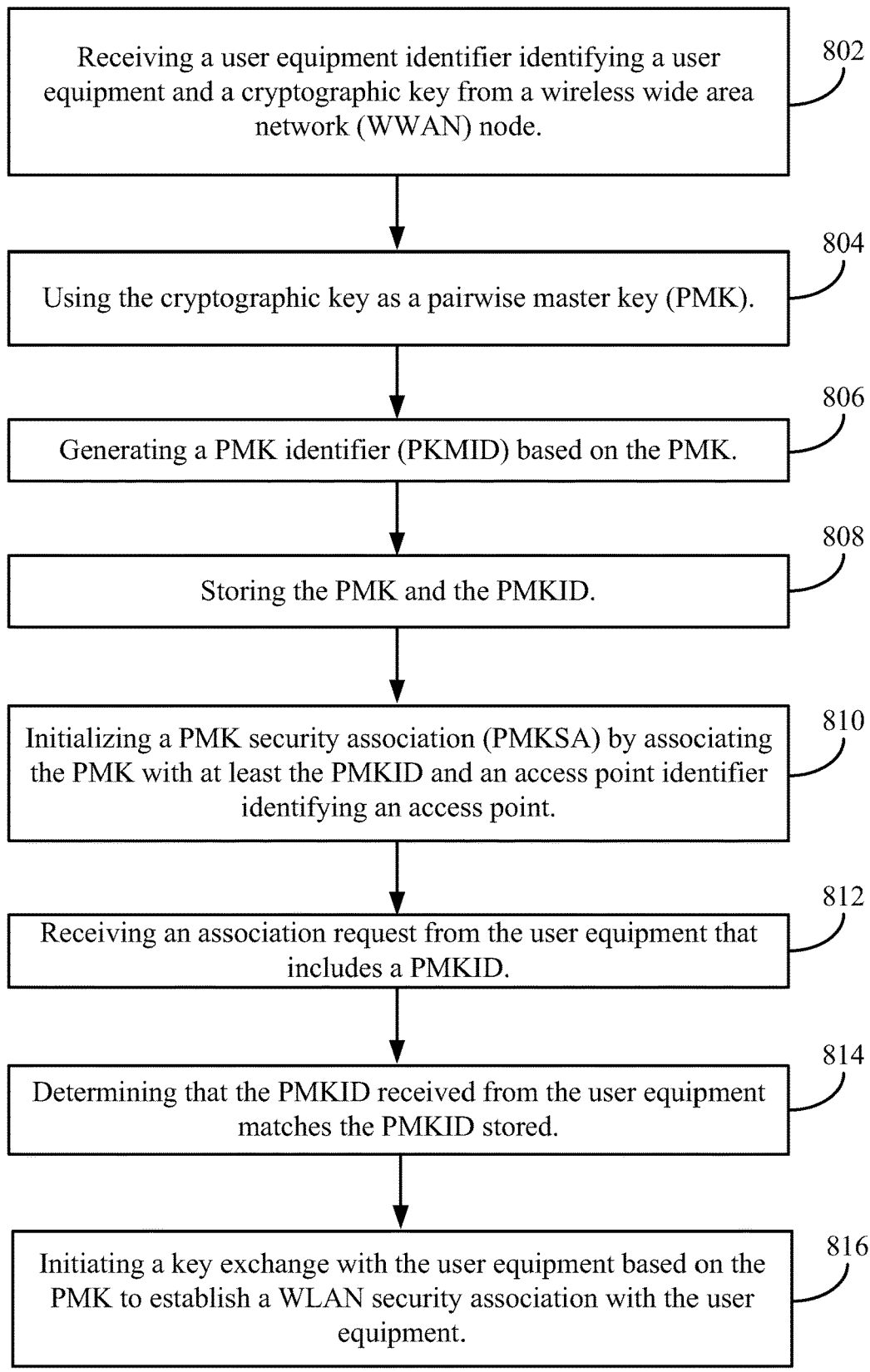
FIG. 8 illustrates a first exemplary method flow diagram for secure wireless communications by a network apparatus.

FIG. 8 illustrates a method flow diagram for secure wireless communications by a network and/or network apparatus (e.g., WLAN, AP, and/or WTP). First, a user equipment identifier identifying a user equipment and a cryptographic key (e.g., S-$K_{WT}$) are received 802 from a wireless wide area network (WWAN) node. Next, the cryptographic key is used 804 as a pairwise master key (PMK). Then, a PMK identifier (PKMID) is generated 806 based on the PMK. Next, the PMK and the PKMID is stored 808 at the apparatus. Then, a PMK security association (PMKSA) is initialized 810 by associating the PMK with at least the PMKID and an access point identifier identifying an access point of the apparatus. Next, an association request is received 812 from the user equipment that includes a PMKID. Then, it is determined 814 that the PMKID received from the user equipment matches the PMKID stored at the apparatus. Next, a key exchange is initiated 816 with the user equipment based on the PMK to establish a WLAN security association with the user equipment.

Figure 9A:
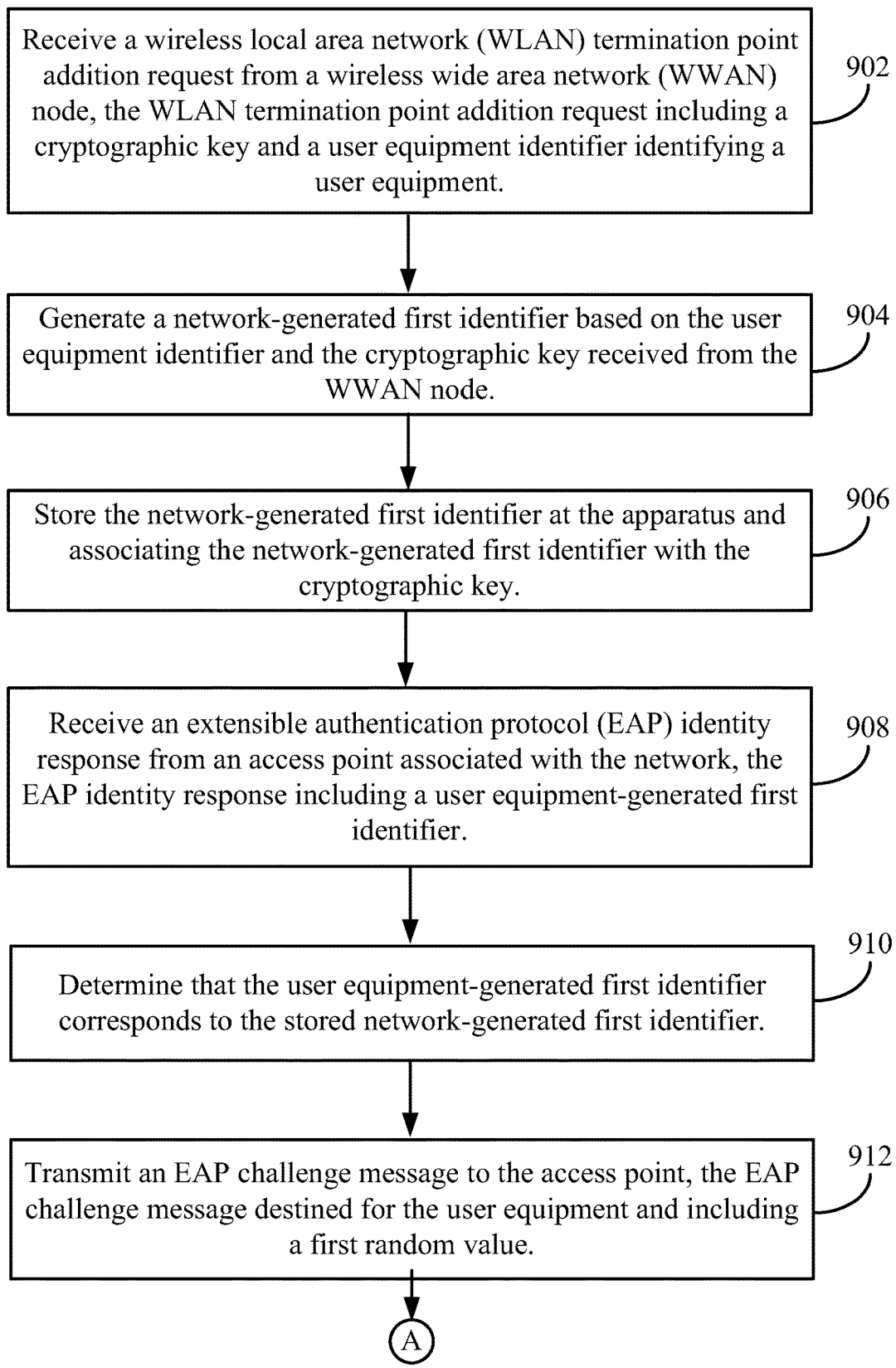
FIGS. 9A and 9B illustrate a second exemplary method flow diagram for secure wireless communications by a network apparatus such as a WLAN termination point.
Figure 9B:
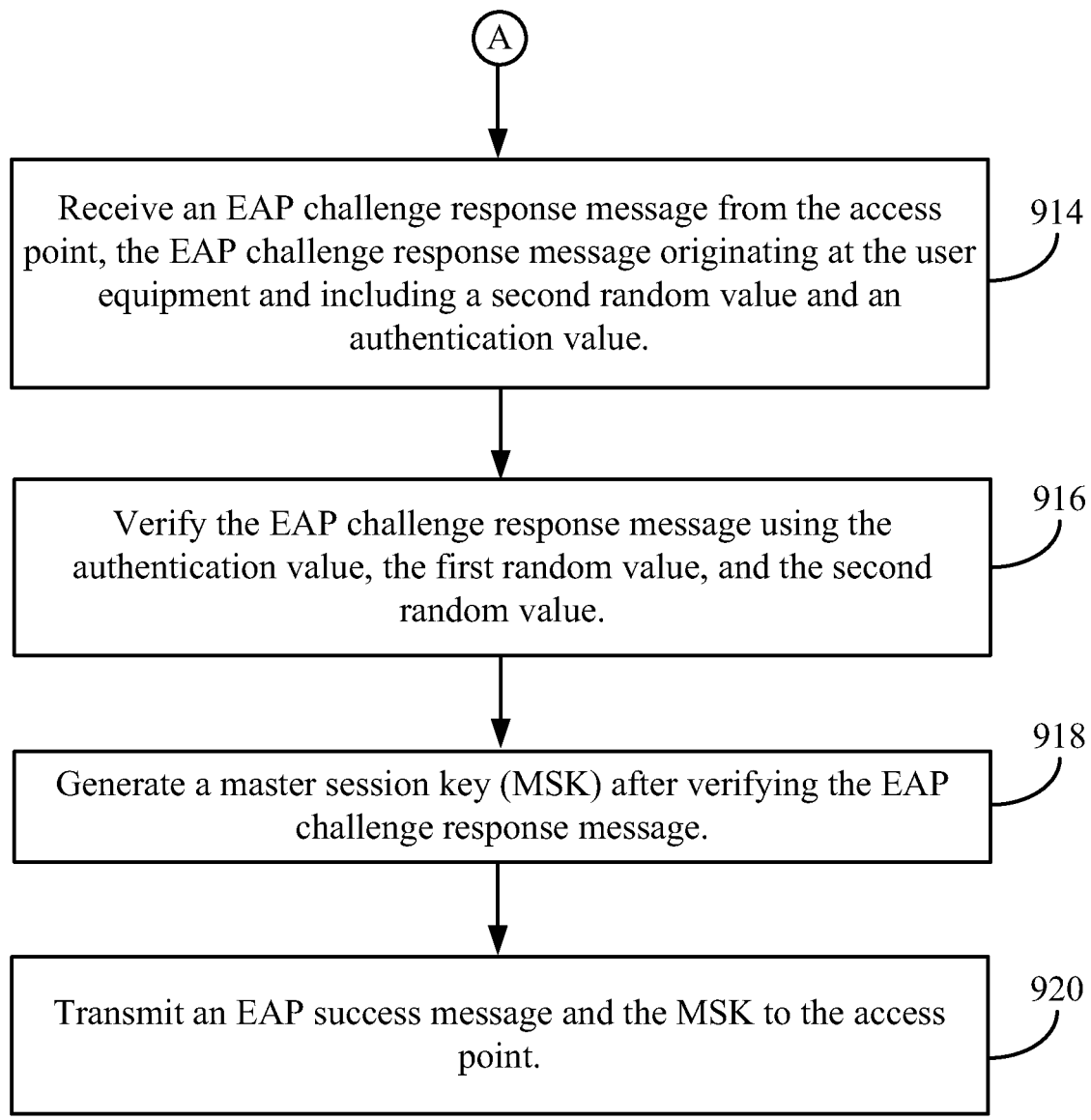

FIGS. 9A and 9B illustrate a method flow diagram for secure wireless communications by a network apparatus (e.g., WTP). First, a wireless local area network (WLAN) termination point addition request is received 902 from a wireless wide area network (WWAN) node, the WLAN termination point addition request including a cryptographic key (e.g., S-$K_{WT}$) and a user equipment identifier (e.g., UE MAC address) identifying a user equipment. Next, a network-generated first identifier (e.g., LWA-ID) is generated 904 based on the user equipment identifier and the cryptographic key received from the WWAN node. Then, the network-generated first identifier is stored 906 at the apparatus and associating the network-generated first identifier with the cryptographic key. Next, an extensible authentication protocol (EAP) identity response is received 908 from an access point associated with the network, the EAP identity response including a user equipment-generated first identifier (e.g., LWA-ID as part of LWA-ID@realm). Then, it's determined 910 that the user equipment-generated first identifier corresponds to the stored network-generated first identifier. Next, an EAP challenge message is transmitted 912 to the access point, the EAP challenge message destined for the user equipment and including a first random value (e.g., AS_nonce). Then, an EAP challenge response message is received 914 from the access point, the EAP challenge response message originating at the user equipment and including a second random value (e.g., STA_nonce) and an authentication value (e.g., AUTHRES). Next, the EAP challenge response message is verified 916 using the authentication value, the first random value, and the second random value. Then, a master session key (MSK) is generated 918 after verifying the EAP challenge response message. Next, an EAP success message and the MSK is transmitted 920 to the access point.

Figure 10A:
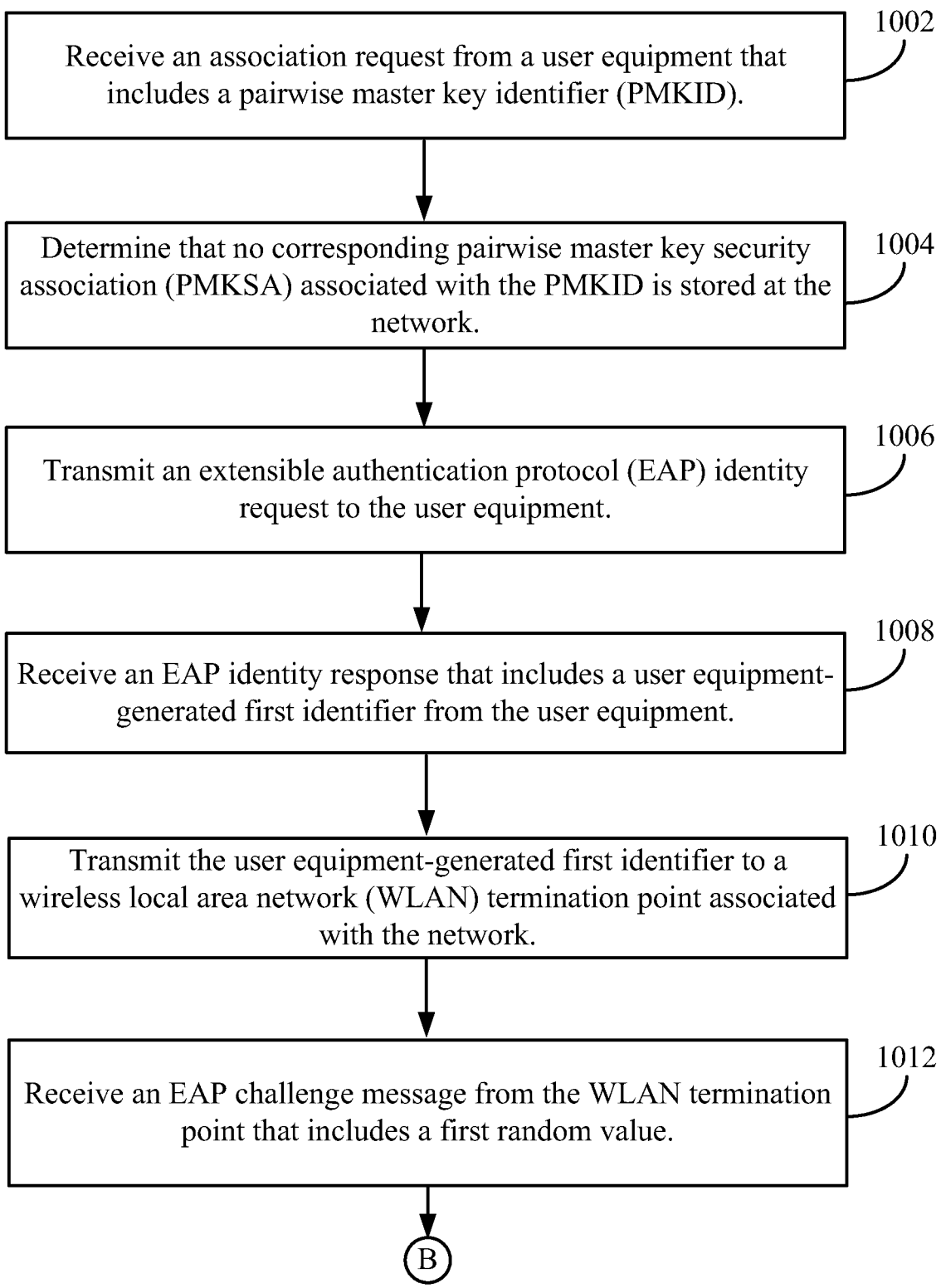
FIGS. 10A and 10B illustrate a third exemplary method flow diagram for secure wireless communications by a network apparatus such an access point.
Figure 10B:
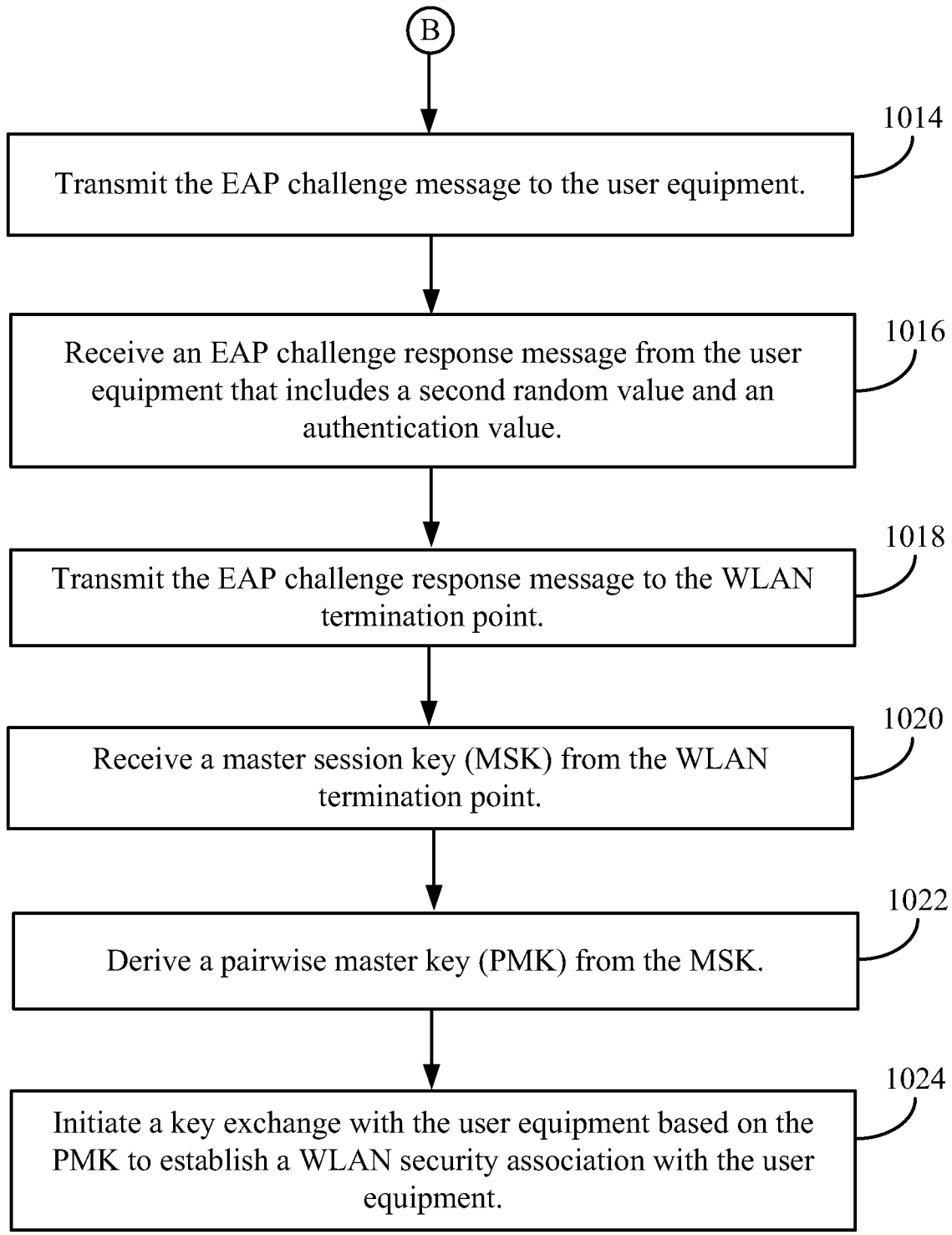

FIGS. 10A and 10B illustrate a method flow diagram for secure wireless communications by a network apparatus (e.g., access point). First, an association request is received 1002 from a user equipment that includes a pairwise master key identifier (PMKID). Next, it's determined 1004 that no corresponding pairwise master key security association (PMKSA) associated with the PMKID is stored at the network. Then, an extensible authentication protocol (EAP) identity request is transmitted 1006 to the user equipment. Next, an EAP identity response is received 1008 that includes a user equipment-generated first identifier (e.g., LWA-ID as part of LWA-ID@realm) from the user equipment. Then, the user equipment-generated first identifier is transmitted 1010 to a wireless local area network (WLAN) termination point associated with the network. Next, an EAP challenge message is received 1012 from the WLAN termination point that includes a first random value (e.g., AS_nonce). Then, the EAP challenge message is transmitted 1014 to the user equipment. Next, an EAP challenge response message is received 1016 from the user equipment that includes a second random value (e.g., STA_nonce) and an authentication value (e.g., AUTHRES). Then, the EAP challenge response message is transmitted 1018 to the WLAN termination point. Next, a master session key (MSK) is received 1020 from the WLAN termination point. Then, a pairwise master key (PMK) is derived 1022 from the MSK, and a key exchange is initiated 1024 with the user equipment based on the PMK to establish a WLAN security association with the user equipment.

Figure 11:
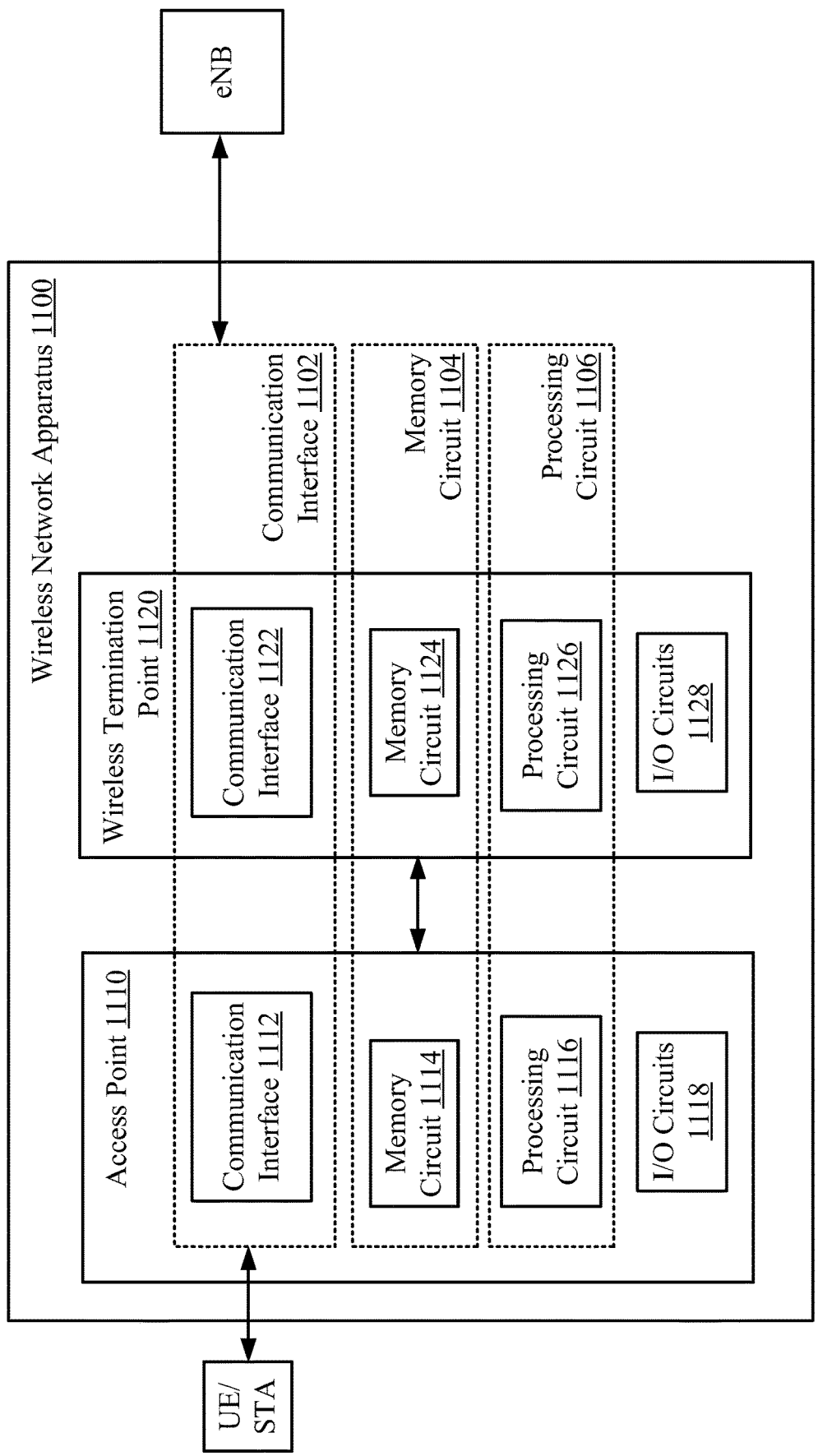
FIG. 11 illustrates a schematic block diagram of a wireless network apparatus.

FIG. 11 illustrates a schematic block diagram of a wireless communication network apparatus (e.g., WLAN apparatus) 1100 according to one aspect of the disclosure. The network 1100 includes at least one access point 1110 and at least one wireless termination point 1120 that are in communication with each other. The network 1100 may include many more access points communicatively coupled to the wireless termination point 1120 and/or communicatively coupled to additional wireless termination points not shown in FIG. 11. The AP 1110 and WTP 1120 shown in FIG. 11 may be part of a single apparatus 1100 or each 1110, 1120 may be separate apparatuses housed independently of one another within an wireless local area network.

The exemplary access point 1110 of the network 1100 may include at least one or more communication interfaces 1112, one or more memory circuits 1114, one or more processing circuits 1116, and/or one or more input and/or output (I/O) devices/circuits 1118 that are each communicatively coupled to one another. The communication interface 1112 allows the access point 1110 to communicate wirelessly with one or more UE/STA. Thus, the interface 1112 allows the access point 1110 to communicate wirelessly through WLAN protocols, such as 802.1x, or other protocols (Zigbee®, Bluetooth®, etc).

The access point's memory circuit 1114 may include one or more volatile memory circuits and/or non-volatile memory circuits. Thus, the memory circuit 1114 may include DRAM, SRAM, MRAM, EEPROM, flash memory, etc. The memory circuit 1114 may store one or more cryptographic keys, variables, nonces, values, etc. The memory circuit 1114 may also store instructions that may be executed by the processing circuit 1116. The I/O devices/circuits 1118 may include one or more keyboards, mice, displays, touchscreen displays, printers, fingerprint scanners, and any other input and/or output devices.

The access point's processing circuit 1116 (e.g., processor, central processing unit (CPU), application processing unit (APU), etc.) may execute instructions stored at the memory circuit 1114 and/or instructions stored at another computer-readable storage medium (e.g., hard disk drive, optical disk drive, solid-state drive, etc.) communicatively coupled to the access point 1110. The processing circuit 1116 may perform any one of the steps and/or processes of the access points described herein including those discussed with reference to FIGS. 1, 2, 3, 4, 5A, 5B, 6A, 6B, 7A, 7B, 7C, 8, 10A, and/or 10B.

The exemplary wireless termination point 1120 of the network 1100 may include at least one or more communication interfaces 1122, one or more memory circuits 1124, one or more processing circuits 1126, and/or one or more input and/or output (I/O) devices/circuits 1128 that are each communicatively coupled to one another. The communication interface 1122 allows the wireless termination point 1120 to communicate wirelessly with one or more WWAN nodes such as an eNB.

The wireless termination point's memory circuit 1124 may include one or more volatile memory circuits and/or non-volatile memory circuits. Thus, the memory circuit 1124 may include DRAM, SRAM, MRAM, EEPROM, flash memory, etc. The memory circuit 1124 may store one or more cryptographic keys, variables, nonces, values, etc. The memory circuit 1124 may also store instructions that may be executed by the processing circuit. The I/O devices/circuits 1128 may include one or more keyboards, mice, displays, touchscreen displays, printers, fingerprint scanners, and any other input and/or output devices.

The wireless termination point's processing circuit 1126 (e.g., processor, central processing unit (CPU), application processing unit (APU), etc.) may execute instructions stored at the memory circuit 1124 and/or instructions stored at another computer-readable storage medium (e.g., hard disk drive, optical disk drive, solid-state drive, etc.) communicatively coupled to the wireless termination point 1120. The processing circuit 1126 may perform any one of the steps and/or processes of the wireless termination points described herein including those discussed with reference to FIGS. 1, 2, 3, 4, 5A, 5B, 6A, 6B, 7A, 7B, 7C, 8, 9A, and/or 9B.

The network 1100 may include a communication interface 1102 that includes, in part, the communication interfaces 1112, 1122 of the access point 1110 and the wireless termination point 1120. Similarly, the network may include a memory circuit 1104 that includes, in part, the memory circuits 1114, 1124 of the access point 1110 and the wireless termination point 1120. The network may also include a processing circuit 1106 that includes, in part, the processing circuits 1116, 1128 of the access point 1110 and the wireless termination point 1120. The processing circuit 1106 of the network 1100 is adapted to perform the steps described and shown in FIGS. 8, 9A, 9B, 10A, and/or 10B. The memory circuit 1104 of the network 1100 is adapted to store instructions that when executed by the processing circuit 1106 cause the processing circuit 1106 of the network 1100 to perform the steps described and shown in FIGS. 8, 9A, 9B, 10A, and/or 10B.

Figure 12:
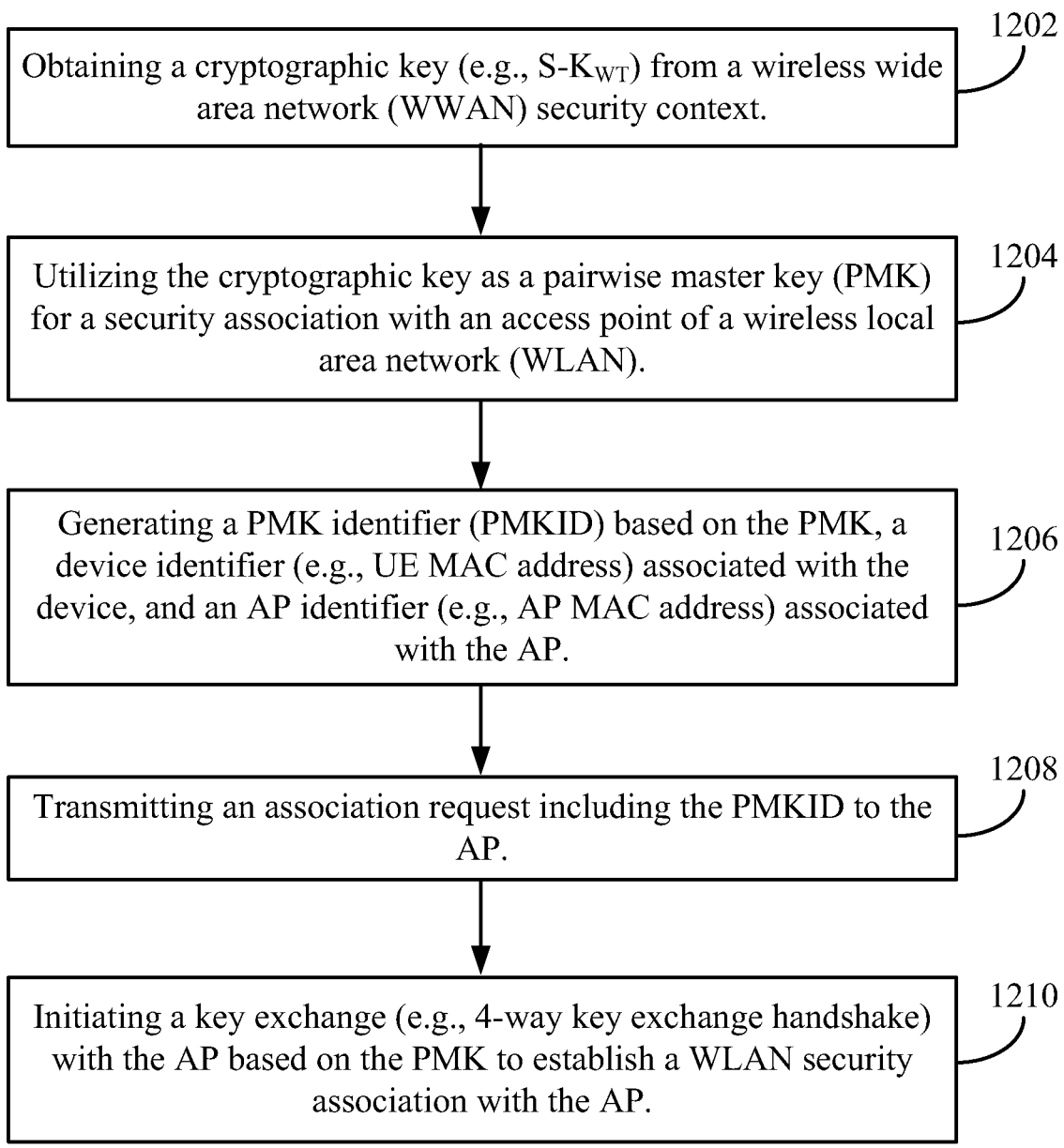
FIG. 12 illustrates a first exemplary method flow diagram for secure wireless communications by a device (e.g., UE/STA).

FIG. 12 illustrates a method flow diagram for secure wireless communications by a device (e.g., UE/STA). First, a cryptographic key (e.g., S-K$_{WT}$) is obtained 1202 from a wireless wide area network (WWAN) security context. Next, the cryptographic key is utilized 1204 as a pairwise master key (PMK) for a security association with an access point of a wireless local area network (WLAN). Then, a PMK identifier (PMKID) is generated 1206 based on the PMK, a device identifier (e.g., UE MAC address) identifying the device, and an access point identifier (e.g., AP MAC address) identifying the AP. Next, an association request is transmitted 1208 including the PMKID to the AP. Then, a key exchange (e.g., 4 way key exchange handshake) is initiated 1210 with the AP based on the PMK to establish a WLAN security association with the AP.

Figure 13A:
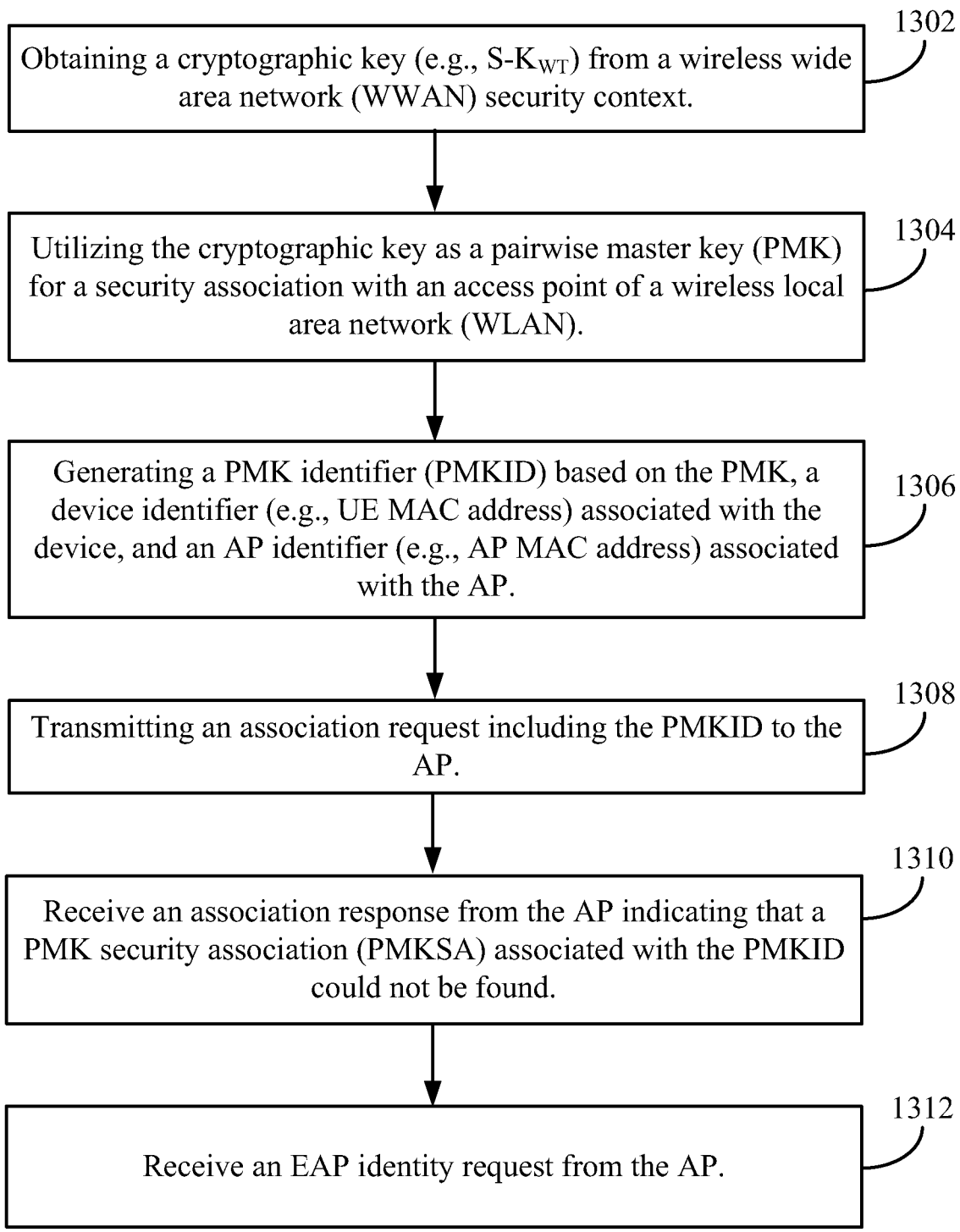
FIGS. 13A and 13B illustrate a second exemplary method flow diagram for secure wireless communications by a device (e.g., UE/STA).
Figure 13B:
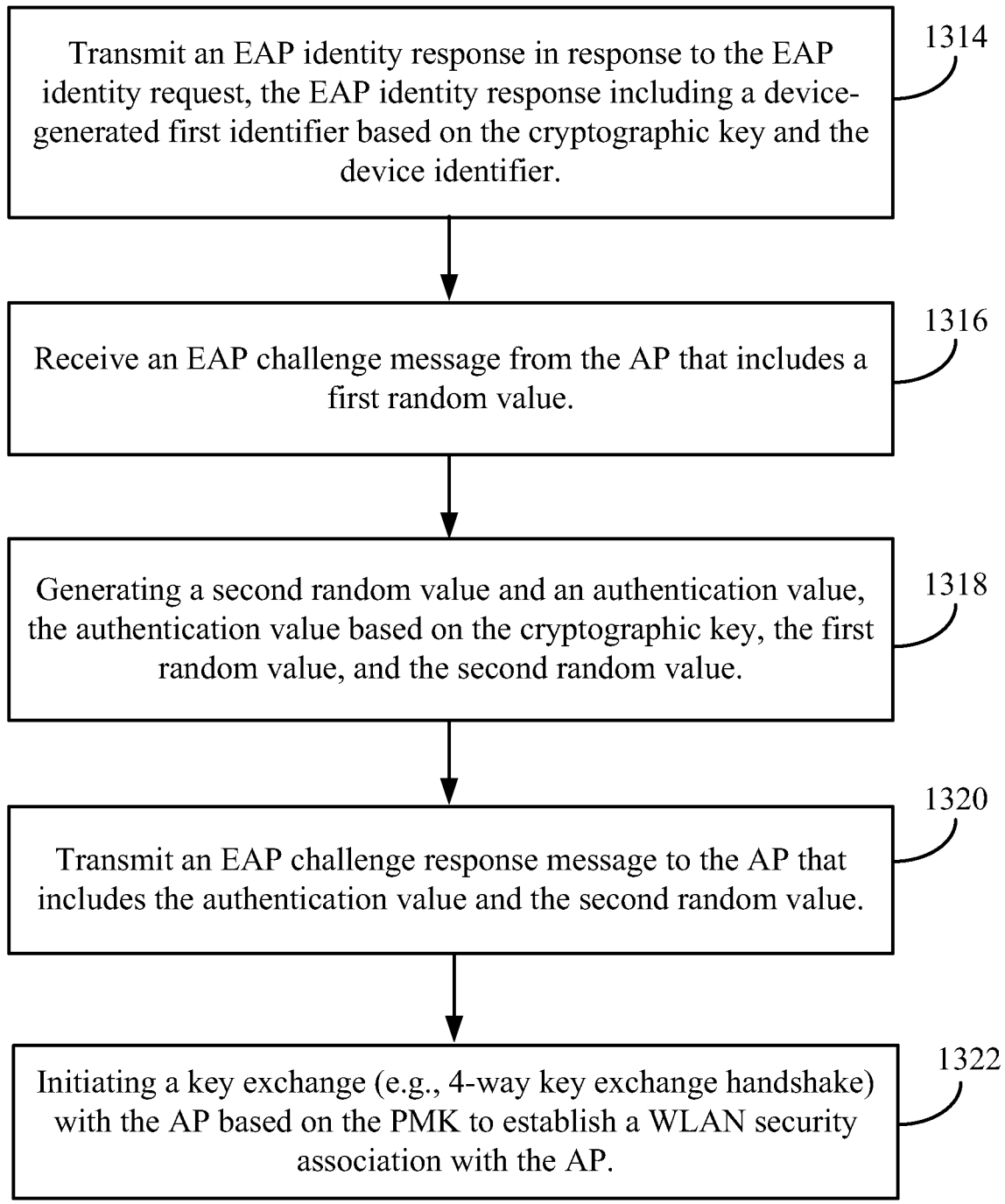

FIG. 13 illustrates a method flow diagram for secure wireless communications by a device (e.g., UE/STA). First, a cryptographic key (e.g., S-K$_{WT}$) is obtained 1302 from a wireless wide area network (WWAN) security context. Next, the cryptographic key is utilized 1304 as a pairwise master key (PMK) for a security association with an access point of a wireless local area network (WLAN). Then, a PMK identifier (PMKID) is generated 1306 based on the PMK, a device identifier (e.g., UE MAC address) identifying the device, and an access point identifier (e.g., AP MAC address) identifying the AP. Next, an association request is transmitted 1308 including the PMKID to the AP. Then, an association response is received 1310 from the AP indicating that a PMK security association (PMKSA) associated with the PMKID could not be found. Next, an EAP identity request is received 1312 from the AP. Then, an EAP identity response is transmitted 1314 in response to the EAP identity request, the EAP identity response including a device-generated first identifier based on the cryptographic key and the device identifier. Next, an EAP challenge message is received 1316 from the AP that includes a first random value. Then, a second random value and an authentication value is generated 1318, the authentication value based on the cryptographic key, the first random value, and the second random value. Next, an EAP challenge response message is transmitted 1320 to the AP that includes the authentication value and the second random value. Then, a key exchange (e.g., 4 way key exchange handshake) is initiated 1322 with the AP based on the PMK to establish a WLAN security association with the AP.

Figure 14:
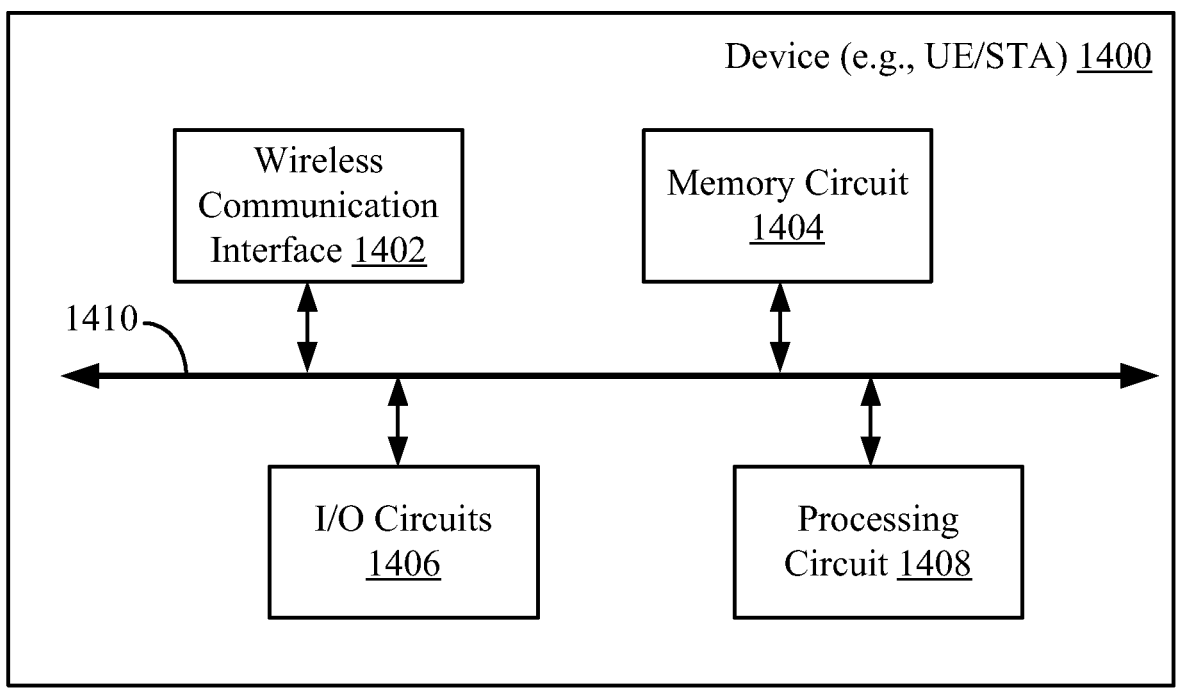
FIG. 14 illustrates a schematic block diagram of a device (UE/STA).

FIG. 14 illustrates a schematic block diagram of a device (e.g., user equipment (UE) and station (STA)) 1400 according to one aspect of the disclosure. The device 1400 may include a plurality of wireless communication interfaces 1402, one or more memory circuits 1404, one or more input and/or output (I/O) devices/circuits 1406, and/or one or more processing circuits 1408 that may be communicatively coupled to one another. For example, the interfaces 1402, the memory circuit 1404, the I/O devices 1406, and the processing circuit 1408 may be communicatively coupled to each other through a bus 1410. The wireless communication interfaces 1402 allow the device 1400 to communicate wirelessly with the eNB 106. Thus, the interface 1402 also allows the device 1400 to communicate wirelessly to the WLAN (e.g., AP 202) through WLAN protocols, such as 802.1x, and/or other protocols such as Zigbee®, Bluetooth®, etc.

The memory circuit 1404 may include one or more volatile memory circuits and/or non-volatile memory circuits. Thus, the memory circuit 1404 may include DRAM, SRAM, MRAM, EEPROM, flash memory, etc. The memory circuit 1404 may store one or more cryptographic keys. The memory circuit 1404 may also store instructions that may be executed by the processing circuit 1408. The I/O devices/circuits 1406 may include one or more keyboards, mice, displays, touchscreen displays, printers, fingerprint scanners, and any other input and/or output devices.

The processing circuit 1408 (e.g., processor, central processing unit (CPU), application processing unit (APU), etc.) may execute instructions stored at the memory circuit 1406 and/or instructions stored at another computer-readable storage medium (e.g., hard disk drive, optical disk drive, solid-state drive, etc.) communicatively coupled to the device 1400. The processing circuit 1408 may perform any one of the steps and/or processes of the UE/STA 102s described herein including those discussed with reference to FIGS. 1-7C, 12, 13A, and/or 13B.

One or more of the components, steps, features, and/or functions illustrated in FIGS. 1, 2, 3, 4, 5A, 5B, 6A, 6B, 7A, 7B, 7C, 8, 9A, 9B, 10A, 10B, 11, 12, 13A, 13B, and/or 14 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 3, 11, and/or 14 may be configured to perform one or more of the methods, features, or steps described in FIGS. 3, 4, 5A, 5B, 6A, 6B, 7A, 7B, 7C, 8, 9A, 9B, 10A, 10B, 12, 13A, and/or 13B. The algorithms described herein may also be efficiently implemented in software and/or embedded in hardware.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing or containing instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. As just one example the processing circuits 1106, 1116, 1126 of FIG. 11 may be ASICs that are hard wired to specifically perform one or more of the steps illustrated in FIGS. 8, 9A, 9B, 10A, and/or 10B. Similarly, the processing circuit 1408 of FIG. 14 may be an ASIC that is hard wired to specifically perform one or more of the steps illustrated in FIGS. 12, 13A, and/or 13B.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method for secure wireless communication at an apparatus associated with a network, the method comprising:
   receiving an association request from a user equipment that includes a pairwise master key identifier (PMKID);
   determining that no corresponding pairwise master key security association (PMKSA) associated with the PMKID is stored at the apparatus;
   transmitting an extensible authentication protocol (EAP) identity request to the user equipment;
   receiving an EAP identity response that includes a user equipment-generated first identifier from the user equipment;
   transmitting the user equipment-generated first identifier to a wireless local area network (WLAN) termination point associated with the apparatus;
   receiving a master session key (MSK) from the WLAN termination point;
   deriving a pairwise master key (PMK) from the MSK; and
   initiating a key exchange with the user equipment based on the PMK to establish a WLAN security association with the user equipment,
   wherein the EAP identity response includes a realm value that identifies the WLAN termination point that the user equipment-generated first identifier is transmitted to, the realm value further identifying a serving network identity of a wireless wide area network (WWAN) node in communication with the WLAN termination point.

2. The method of claim 1, wherein the user equipment-generated first identifier is equal to SHA-256(cryptographic key, user equipment identifier, STRING_0) where SHA stands for Secure Hash Algorithm and STRING_0 is an input string value.

3. The method of claim 1, wherein the method further comprises:
   receiving an EAP challenge message from the WLAN termination point that includes a first random value;
   transmitting the EAP challenge message to the user equipment;
   receiving an EAP challenge response message from the user equipment that includes a second random value and an authentication value; and
   transmitting the EAP challenge response message to the WLAN termination point.

4. The method of claim 3, wherein the EAP challenge message transmitted to the user equipment is transmitted according to an authentication, authorization, and accounting (AAA) scheme, and the EAP challenge response message is received from the user equipment according to the authentication, authorization, and accounting (AAA) scheme.

5. An apparatus comprising:
   a memory circuit;
   a communication interface adapted to communicate with a user equipment and a wireless local area network (WLAN) termination point; and
   a processing circuit communicatively coupled to the memory circuit and the communication interface, the processing circuit adapted to:
      receive an association request from the user equipment that includes a pairwise master key identifier (PMKID),
      determine that no corresponding pairwise master key security association (PMKSA) associated with the PMKID is stored at the memory circuit,
      transmit an extensible authentication protocol (EAP) identity request to the user equipment,
      receive an EAP identity response that includes a user equipment-generated first identifier from the user equipment,
      transmit the user equipment-generated first identifier to the WLAN termination point associated with the apparatus,
      receive a master session key (MSK) from the WLAN termination point,
      derive a pairwise master key (PMK) from the MSK, and
      initiate a key exchange with the user equipment based on the PMK to establish a WLAN security association with the user equipment,
      wherein the EAP identity response includes a realm value that identifies the WLAN termination point that the user equipment-generated first identifier is transmitted to, the realm value further identifying a serving network identity of a wireless wide area network (WWAN) node in communication with the WLAN termination point.

6. The apparatus of claim 5, wherein the user equipment-generated first identifier is equal to SHA-256(cryptographic key, user equipment identifier, STRING_0) where SHA stands for Secure Hash Algorithm and STRING_0 is an input string value.

7. The apparatus of claim 5, wherein the processing circuit is further adapted to:
   receive an EAP challenge message from the WLAN termination point that includes a first random value;
   transmit the EAP challenge message to the user equipment;
   receive an EAP challenge response message from the user equipment that includes a second random value and an authentication value; and
   transmit the EAP challenge response message to the WLAN termination point.

8. The apparatus of claim 7, wherein the EAP challenge message transmitted to the user equipment is transmitted according to an authentication, authorization, and accounting (AAA) scheme, and the EAP challenge response message is received from the user equipment according to the authentication, authorization, and accounting (AAA) scheme.

9. An apparatus comprising:
means for receiving an association request from a user equipment that includes a pairwise master key identifier (PMKID);
means for determining that no corresponding pairwise master key security association (PMKSA) associated with the PMKID is stored at the apparatus;
means for transmitting an extensible authentication protocol (EAP) identity request to the user equipment;
means for receiving an EAP identity response that includes a user equipment-generated first identifier from the user equipment;
means for transmitting the user equipment-generated first identifier to a wireless local area network (WLAN) termination point associated with the apparatus;
means for receiving a master session key (MSK) from the WLAN termination point;
means for deriving a pairwise master key (PMK) from the MSK; and
means for initiating a key exchange with the user equipment based on the PMK to establish a WLAN security association with the user equipment,
wherein the EAP identity response includes a realm value that identifies the WLAN termination point that the user equipment-generated first identifier is transmitted to, the realm value further identifying a serving network identity of a wireless wide area network (WWAN) node in communication with the WLAN termination point.

10. The apparatus of claim 9, further comprising:
means for receiving an EAP challenge message from the WLAN termination point that includes a first random value;
means for transmitting the EAP challenge message to the user equipment;
means for receiving an EAP challenge response message from the user equipment that includes a second random value and an authentication value; and
means for transmitting the EAP challenge response message to the WLAN termination point.

11. A non-transitory computer-readable storage medium having instructions stored thereon for secure wireless communication by an apparatus associated with a network, the instructions, which when executed by at least one processor, causes the processor to:
receive an association request from a user equipment that includes a pairwise master key identifier (PMKID);
determine that no corresponding pairwise master key security association (PMKSA) associated with the PMKID is stored at the network;
transmit an extensible authentication protocol (EAP) identity request to the user equipment;
receive an EAP identity response that includes a user equipment-generated first identifier from the user equipment;
transmit the user equipment-generated first identifier to a wireless local area network (WLAN) termination point associated with the apparatus;
receive a master session key (MSK) from the WLAN termination point;
derive a pairwise master key (PMK) from the MSK; and
initiate a key exchange with the user equipment based on the PMK to establish a WLAN security association with the user equipment,
wherein the EAP identity response includes a realm value that identifies the WLAN termination point that the user equipment-generated first identifier is transmitted to, the realm value further identifying a serving network identity of a wireless wide area network (WWAN) node in communication with the WLAN termination point.

12. The non-transitory computer-readable storage medium of claim 11, the instructions when executed by the processor further cause the processor to:
receive an EAP challenge message from the WLAN termination point that includes a first random value;
transmit the EAP challenge message to the user equipment;
receive an EAP challenge response message from the user equipment that includes a second random value and an authentication value; and
transmit the EAP challenge response message to the WLAN termination point.

13. The apparatus of claim 9, wherein the user equipment-generated first identifier is equal to SHA-256(cryptographic key, user equipment identifier, STRING_0), where SHA stands for Secure Hash Algorithm and STRING_0 is an input string value.

14. The apparatus of claim 10, wherein the EAP challenge message transmitted to the user equipment is transmitted according to an authentication, authorization, and accounting (AAA) scheme, and the EAP challenge response message is received from the user equipment according to the authentication, authorization, and accounting (AAA) scheme.

15. The apparatus of claim 11, wherein the user equipment-generated first identifier is equal to SHA-256(cryptographic key, user equipment identifier, STRING_0), where SHA stands for Secure Hash Algorithm and STRING_0 is an input string value.

16. The apparatus of claim 12, wherein the EAP challenge message transmitted to the user equipment is transmitted according to an authentication, authorization, and accounting (AAA) scheme, and the EAP challenge response message is received from the user equipment according to the authentication, authorization, and accounting (AAA) scheme.

17. The method of claim 1, further comprising:
transmitting an association response to the user equipment in response to receiving the association request from the user equipment.

18. The method of claim 1, wherein the user equipment-generated first identifier is a long term evolution (LTE) WLAN aggregation (LWA) identifier (LWA-ID), and the apparatus receives an LWA-ID@realm in the EAP identity response.

19. The method of claim 18, wherein the realm identifies a serving network identity of the WWAN node and further identifies at least one of: the WWAN node identity or a public line mobile network (PLMN) identity associated with the WWAN node.

20. The method of claim 18, further comprising:
forwarding the LWA-ID@realm to a WLAN termination point (WTP) according to an authentication, authorization, and accounting (AAA) scheme.

21. The method of claim 1, further comprising:
receiving an EAP- long term evolution (LTE) WLAN aggregation (LWA) (EAP-LWA) Request message including a first random value,
transmitting the EAP-LWA Request message to the user equipment (UE)
receiving an EAP-LWA Response message including an authentication response (AUTHRES) value and a second random value;
transmitting the EAP-LWA Response message including the AUTHRES value and the second random value to the WTP; and
receiving an EAP-LWA success message including an MSK from the WTP in response to transmitting the EAP-LWA Response message including the AUTHRES value and the second random value to the WTP.

22. The method of claim 21, wherein the EAP-LWA Request message, the EAP-LWA Response message, and the EAP-LWA Success message are exchanged according to an AAA scheme with the WTP acting as an authentication server.

23. The apparatus of claim 5, the processing circuit further adapted to:
transmit an association response to the user equipment in response to receiving the association request from the user equipment.

24. The apparatus of claim 5, wherein the user equipment-generated first identifier is a long term evolution (LTE) WLAN aggregation (LWA) identifier (LWA-ID), and the apparatus receives an LWA-ID@realm in the EAP identity response.

25. The apparatus of claim 24, wherein the realm identifies a serving network identity of the WWAN node and further identifies at least one of: the WWAN node identity or a public line mobile network (PLMN) identity associated with the WWAN node.

26. The apparatus of claim 24, the processing circuit further adapted to:
forward the LWA-ID@realm to a WLAN termination point (WTP) according to an authentication, authorization, and accounting (AAA) scheme.

27. The apparatus of claim 5, the processing circuit further adapted to:
receive an EAP- long term evolution (LTE) WLAN aggregation (LWA) (EAP-LWA) Request message including a first random value,
transmit the EAP-LWA Request message to the user equipment (UE)
receive an EAP-LWA Response message including an authentication response (AUTHRES) value and a second random value;
transmit the EAP-LWA Response message including the AUTHRES value and the second random value to the WTP; and
receive an EAP-LWA success message including an MSK from the WTP in response to transmitting the EAP-LWA Response message including the AUTHRES value and the second random value to the WTP.

28. The apparatus of claim 27, wherein the EAP-LWA Request message, the EAP-LWA Response message, and the EAP-LWA Success message are exchanged according to an AAA scheme with the WTP acting as an authentication server.

29. The apparatus of claim 9, further comprising:
means for transmitting an association response to the user equipment in response to receiving the association request from the user equipment.

30. The apparatus of claim 9, wherein the user equipment-generated first identifier is a long term evolution (LTE) WLAN aggregation (LWA) identifier (LWA-ID), and the apparatus receives an LWA-ID@realm in the EAP identity response.

31. The apparatus of claim 30, wherein the realm identifies a serving network identity of the WWAN node and further identifies at least one of: the WWAN node identity or a public line mobile network (PLMN) identity associated with the WWAN node.

32. The apparatus of claim 30, further comprising:
means for forwarding the LWA-ID@realm to a WLAN termination point (WTP) according to an authentication, authorization, and accounting (AAA) scheme.

33. The apparatus of claim 9, further comprising:
means for receiving an EAP- long term evolution (LTE) WLAN aggregation (LWA) (EAP-LWA) Request message including a first random value,
means for transmitting the EAP-LWA Request message to the user equipment (UE)
means for receiving an EAP-LWA Response message including an authentication response (AUTHRES) value and a second random value;
means for transmitting the EAP-LWA Response message including the AUTHRES value and the second random value to the WTP; and
means for receiving an EAP-LWA success message including an MSK from the WTP in response to transmitting the EAP-LWA Response message including the AUTHRES value and the second random value to the WTP.

34. The apparatus of claim 33, wherein the EAP-LWA Request message, the EAP-LWA Response message, and the EAP-LWA Success message are exchanged according to an AAA scheme with the WTP acting as an authentication server.

35. The non-transitory computer-readable storage medium of claim 11, the instructions when executed by the processor further cause the processor to:
transmit an association response to the user equipment in response to receiving the association request from the user equipment.

36. The non-transitory computer-readable storage medium of claim 11, wherein the user equipment-generated first identifier is a long term evolution (LTE) WLAN aggregation (LWA) identifier (LWA-ID), and the apparatus receives an LWA-ID@realm in the EAP identity response.

37. The non-transitory computer-readable storage medium of claim 36, wherein the realm identifies a serving network identity of the WWAN node and further identifies at least one of: the WWAN node identity or a public line mobile network (PLMN) identity associated with the WWAN node.

38. The non-transitory computer-readable storage medium of claim 36, the instructions when executed by the processor further cause the processor to:
forward the LWA-ID@realm to a WLAN termination point (WTP) according to an authentication, authorization, and accounting (AAA) scheme.

39. The non-transitory computer-readable storage medium of claim 11, the instructions when executed by the processor further cause the processor to:
- receive an EAP- long term evolution (LTE) WLAN aggregation (LWA) (EAP-LWA) Request message including a first random value,
- transmit the EAP-LWA Request message to the user equipment (UE)
- receive an EAP-LWA Response message including an authentication response (AUTHRES) value and a second random value;
- transmit the EAP-LWA Response message including the AUTHRES value and the second random value to the WTP; and
- receive an EAP-LWA success message including an MSK from the WTP in response to transmitting the EAP-LWA Response message including the AUTHRES value and the second random value to the WTP.

40. The non-transitory computer-readable storage medium of claim 39, wherein the EAP-LWA Request message, the EAP-LWA Response message, and the EAP-LWA Success message are exchanged according to an AAA scheme with the WTP acting as an authentication server.

* * * * *